US011386257B2

(12) United States Patent
Lu et al.

(10) Patent No.: US 11,386,257 B2
(45) Date of Patent: Jul. 12, 2022

(54) EFFICIENT MANIPULATION OF SURFACES IN MULTI-DIMENSIONAL SPACE USING ENERGY AGENTS

(71) Applicant: Famous Industries, Inc., San Francisco, CA (US)

(72) Inventors: Mark H. Lu, Berkeley, CA (US); Steven E. Newcomb, Berkeley, CA (US); Brian R. Maissey, Berkeley, CA (US); Andrew J. L. de Andrade, San Francisco, CA (US)

(73) Assignee: Amaze Software, Inc., San Francisco, CA (US)

( * ) Notice: Subject to any disclaimer, the term of this patent is extended or adjusted under 35 U.S.C. 154(b) by 470 days.

(21) Appl. No.: 14/054,570

(22) Filed: Oct. 15, 2013

(65) Prior Publication Data

US 2014/0108915 A1 Apr. 17, 2014

Related U.S. Application Data

(60) Provisional application No. 61/714,130, filed on Oct. 15, 2012.

(51) Int. Cl.
*G06F 3/04815* (2022.01)
*G06F 40/143* (2020.01)
*G06F 3/04883* (2022.01)

(52) U.S. Cl.
CPC ........ *G06F 40/143* (2020.01); *G06F 3/04815* (2013.01); *G06F 3/04883* (2013.01); *G06F 2203/04802* (2013.01)

(58) Field of Classification Search
CPC ............. G06F 17/2247; G06F 3/04815; G06F 2203/04802
See application file for complete search history.

(56) References Cited

U.S. PATENT DOCUMENTS

| 6,448,977 | B1 | 9/2002 | Braun et al. |
| 6,731,314 | B1 | 5/2004 | Cheng et al. |
| 6,922,724 | B1 | 7/2005 | Freeman et al. |
| 7,069,507 | B1 | 6/2006 | Alcazar et al. |

(Continued)

FOREIGN PATENT DOCUMENTS

| WO | 2001029702 A2 | 4/2001 |
| WO | 2003081458 A1 | 10/2003 |
| WO | WO 2011063561 A1 | 6/2011 |

OTHER PUBLICATIONS

International Search Report and Written Opinion for PCT/US2013/065124, dated Mar. 10, 2014 (18 pages).

(Continued)

*Primary Examiner* — Kavita Stanley
(74) *Attorney, Agent, or Firm* — VLP Law Group LLP; Michel Bohn

(57) ABSTRACT

Various implementations for efficiently manipulating surfaces in a multi-dimensional space using energy agents are described. A context including one or more surfaces is rendered for display in the multi-dimensional space. One or more events manipulating the one or more surfaces of the context are detected. One or more energy agents are computed for the one or more surfaces of the context based on the one or more events. A visual effect manipulating the one or more surfaces of the context is applied based on the one or more energy agents.

19 Claims, 33 Drawing Sheets

(56) References Cited

U.S. PATENT DOCUMENTS

| | | |
|---|---|---|
| 7,152,210 B1 | 12/2006 | Van Den Hoven et al. |
| 7,469,381 B2 | 12/2008 | Ording |
| 7,479,949 B2 | 1/2009 | Jobs et al. |
| 7,786,975 B2 | 8/2010 | Ording et al. |
| 8,239,784 B2 | 8/2012 | Hotelling et al. |
| 8,701,032 B1 | 4/2014 | Zhai et al. |
| 8,752,183 B1 | 6/2014 | Heiderich et al. |
| 9,245,177 B2 | 1/2016 | Perez |
| 9,323,503 B1 * | 4/2016 | Fontes ................ G06F 17/5009 |
| 9,449,516 B2 | 9/2016 | Ricci |
| 9,461,876 B2 | 10/2016 | Van Dusen et al. |
| 9,501,171 B1 | 11/2016 | Newcomb et al. |
| 10,203,866 B2 | 2/2019 | Karunamuni et al. |
| 10,331,293 B2 | 6/2019 | Bastide et al. |
| 2001/0001879 A1 | 5/2001 | Kubik et al. |
| 2002/0036618 A1 | 3/2002 | Wakai et al. |
| 2002/0194388 A1 | 12/2002 | Boloker et al. |
| 2003/0063073 A1 | 4/2003 | Geaghan et al. |
| 2003/0101235 A1 | 5/2003 | Zhang |
| 2004/0002902 A1 | 1/2004 | Muehlhaeuser |
| 2004/0189720 A1 | 9/2004 | Wilson et al. |
| 2004/0194115 A1 | 9/2004 | Mogilevsky et al. |
| 2004/0230903 A1 | 11/2004 | Elza et al. |
| 2004/0261083 A1 | 12/2004 | Alcazar et al. |
| 2005/0012723 A1 | 1/2005 | Pallakoff |
| 2005/0022211 A1 | 1/2005 | Veselov et al. |
| 2006/0010400 A1 | 1/2006 | Dehlin et al. |
| 2006/0080604 A1 | 4/2006 | Anderson |
| 2006/0101354 A1 | 5/2006 | Hashimoto et al. |
| 2006/0200331 A1 * | 9/2006 | Bordes ................ G06F 17/5009 703/13 |
| 2006/0218511 A1 | 9/2006 | Kapoor |
| 2007/0110083 A1 | 5/2007 | Krishnamoorthy et al. |
| 2007/0250823 A1 | 10/2007 | Kono |
| 2008/0036743 A1 | 2/2008 | Westerman et al. |
| 2008/0098296 A1 * | 4/2008 | Brichford et al. ............ 715/234 |
| 2008/0126944 A1 | 5/2008 | Curtis et al. |
| 2008/0168384 A1 * | 7/2008 | Platzer et al. ................ 715/784 |
| 2008/0209442 A1 | 8/2008 | Setlur et al. |
| 2009/0106775 A1 | 4/2009 | Cermak et al. |
| 2009/0210819 A1 | 8/2009 | Fujimoto et al. |
| 2009/0244309 A1 | 10/2009 | Maison et al. |
| 2010/0197395 A1 | 8/2010 | Geiss |
| 2010/0229186 A1 | 9/2010 | Sathish |
| 2010/0325575 A1 | 12/2010 | Platzer et al. |
| 2011/0022332 A1 | 1/2011 | Kailas et al. |
| 2011/0164029 A1 | 7/2011 | King et al. |
| 2011/0196864 A1 * | 8/2011 | Mason ................ G06F 3/0416 707/728 |
| 2011/0202847 A1 | 8/2011 | Dimitrov |
| 2011/0261083 A1 | 10/2011 | Wilson |
| 2011/0264787 A1 | 10/2011 | Mickens et al. |
| 2011/0267083 A1 | 11/2011 | Tsuji |
| 2012/0017147 A1 | 1/2012 | Mark |
| 2012/0062604 A1 | 3/2012 | Lobo et al. |
| 2012/0137233 A1 | 5/2012 | Lewontin |
| 2012/0167017 A1 | 6/2012 | Oh |
| 2012/0013619 A1 | 7/2012 | Brath |
| 2012/0173977 A1 | 7/2012 | Walker et al. |
| 2012/0174121 A1 | 7/2012 | Treat et al. |
| 2012/0191993 A1 | 7/2012 | Drader et al. |
| 2012/0266109 A1 | 10/2012 | Lim et al. |
| 2012/0268364 A1 | 10/2012 | Minnen |
| 2013/0046518 A1 * | 2/2013 | Mejdrich ................ G06T 1/20 703/2 |
| 2013/0086516 A1 * | 4/2013 | Rodgers ................ G06T 13/80 715/799 |
| 2013/0132818 A1 * | 5/2013 | Anders ................ G06T 13/00 715/234 |
| 2013/0132895 A1 | 5/2013 | Nemeth et al. |
| 2013/0141375 A1 | 6/2013 | Ludwig et al. |
| 2013/0159893 A1 * | 6/2013 | Lewin ................ G06F 9/4443 715/762 |
| 2013/0176308 A1 * | 7/2013 | Mueller ................ G06T 15/40 345/421 |
| 2013/0218721 A1 | 8/2013 | Borhan et al. |
| 2013/0266292 A1 | 10/2013 | Sandrew et al. |
| 2013/0294651 A1 | 11/2013 | Zhou et al. |
| 2013/0326430 A1 | 12/2013 | Devi et al. |
| 2013/0346851 A1 * | 12/2013 | Leece ................ G06F 17/30905 715/235 |
| 2014/0157209 A1 | 6/2014 | Dalal et al. |
| 2014/0201666 A1 | 7/2014 | Bedikian et al. |
| 2014/0201671 A1 | 7/2014 | Zhai et al. |
| 2014/0250360 A1 | 9/2014 | Jiang et al. |
| 2014/0289867 A1 | 9/2014 | Bukai |
| 2014/0317577 A1 | 10/2014 | Chen et al. |
| 2014/0354540 A1 | 12/2014 | Barazi |
| 2015/0029092 A1 | 1/2015 | Holz et al. |
| 2015/0073907 A1 | 3/2015 | Purves et al. |
| 2015/0091790 A1 | 4/2015 | Forutanpour et al. |
| 2015/0120043 A1 | 4/2015 | Howard et al. |
| 2015/0205474 A1 | 7/2015 | Donelan |
| 2015/0243324 A1 | 8/2015 | Sandrew et al. |
| 2015/0277569 A1 | 10/2015 | Sprenger et al. |
| 2015/0371023 A1 | 12/2015 | Chen et al. |
| 2017/0074652 A1 | 3/2017 | Send et al. |
| 2017/0168622 A1 | 6/2017 | Kikinis |
| 2017/0345218 A1 | 11/2017 | Bedikian et al. |
| 2018/0204111 A1 | 7/2018 | Zadeh et al. |
| 2018/0218389 A1 | 8/2018 | Walker et al. |
| 2019/0012442 A1 | 1/2019 | Hunegnaw |
| 2019/0385066 A1 | 12/2019 | Dong |
| 2020/0097071 A1 | 3/2020 | Johnston et al. |

OTHER PUBLICATIONS

Berr, Jonathan, Fraudulent Online Ad Scheme Considered Biggest Ever. Web cite, Cbsnews.com. Dec. 20, 2016, p. 1-4, Web. Accessed as early as Jan. 12, 2017, https://www.cbsnews.com/news/fraudulent-online-ad-scheme-is-the-biggest-ever/.

Shields, Mike, Facebook Discloses Another Metrics Mishap Affecting Publishers. Wall Street Journal online newspaper. Updated Dec. 16, 2016, p. 1-2, Accessed as early as Jan. 12, 2017, https://www.wsj.com/articles/facebook-discloses-another-metrics-mishap-affecting-publishers-1481896803.

* cited by examiner

```
size: [400, 300] // external size (contents will behave as if they are part of a 400x300 surface)
target: [
    {
        origin: [0.5, 0]
        target: <ID OF TITLE BAR>
    },
    {
        origin: [0, 0]
        target: [
            {
                transform: FM.identity,
                target: <ID OF EXIT BUTTON>
            },
            {
                transform: FM.translate(30, 0)
                target: <ID OF MINIMIZE BUTTON>
            },
            {
                transform: FM.translate(60, 0)
                target: <ID OF MAXIMIZE BUTTON>
            }
        ]
    },
    {
        origin: [0, 0]
        transform: FM.translate(0, 50) // 50 pixels down from top-left
        target: input (content area)
    },
    {
        origin: [0.5, 1]
        target: <ID OF STATUS BAR> // bottom-aligned and centered
    }
]
```

EFFICIENT MANIPULATION OF SURFACES IN MULTI-DIMENSIONAL SPACE USING ENERGY AGENTS

CROSS-REFERENCE TO RELATED APPLICATIONS

This application claims the benefit under 35 U.S.C. § 119(e) of U.S. Provisional Patent Application No. 61/714,130, entitled "User Input Conversion System Using Vector Agents for Rendering Images" filed Oct. 15, 2012, the entire contents of which are incorporated herein by reference.

BACKGROUND

The present disclosure relates to efficient manipulation of surfaces in multi-dimensional space using energy agents.

Performance of web applications in the browser is often unacceptable because the browser was originally designed as a document rendering and interaction engine and not an application engine. Rendering in the browser essentially works like laying the bricks in a brick wall, but starting from the top of the wall and working your way down. As a browser receives portions of an HTML document, it parses it into a tree of elements and nested elements. Each of those elements and their nested elements corresponds to rectangles and rectangles nested within those rectangles, respectively. The parts of the document that have been received and parsed are rendered to the screen from left to right, top to bottom. As new pieces of the document are received and parsed they are rendered as well.

As a result, when rendering the documents, browsers were generally optimized for the display of a document in chunks as pieces of that document are downloaded. This is often why, when downloading a large, long document on slow connections, the viewer can scroll to the bottom and see the document only as far it has been downloaded. In more recent times, browser can generally perform this rendering so fast that the viewer does not even notice that documents are loaded and presented to the user this way.

This may have been an appropriate solution for the download and rendering of documents in the 1990s when browsers first came of age because at that time connections were slow and there was not any real interaction within documents beyond forms, and generally only between documents in the form of hyperlinks. However, since the invention and uptake of Asynchronous JavaScript and XML (AJAX) and related Web 2.0 technologies, and rich form-based uses of the web like forums, social networking, and blogging, the demands for intra-document interactivity has progressed to the point that now people expect HTML documents to be as capable and feature-rich as all the applications they've been using in their operating system of choice, like Linux®, Apple OS X®, Apple iOS, Android™ and various Microsoft Windows OSs.

AJAX, which can be used to send and receive data asynchronously and modify the document structure and the corresponding styling live without reloading the entire page, over stresses the rendering method used by some current browsers because the replacement or restyling of elements so that they no longer fit in the wall forces the browser to re-render the entire document. This re-rendering can result in flicker that is unnatural and unsatisfactory for a user accustomed to the smoothness of native applications, which were developed and matured, beginning in the 1970s and 1980s, under a completely different set of expectations. Thus, there is a need for improving the usability, performance, and visual appearance of web applications when providing feature-rich functionality to users.

SUMMARY

The technology described in this disclosure cures the deficiencies described above in the background section by providing users with a seamless and smooth user experience in interacting with feature-rich web applications. According to one innovative aspect of the subject matter described in this disclosure, a system includes one or more processors, a rendering engine, an interaction engine, and a physics engine. The rendering engine, an interaction engine, and a physics engine are executable by the one or more processors to perform certain acts. The rendering engine renders a context including one or more surfaces for display in a multi-dimensional space. The interaction engine detects one or more events manipulating the one or more surfaces of the context. The physics engine computes one or more energy agents for the one or more surfaces of the context based on the one or more events. The rendering engine further applies a visual effect manipulating the one or more surfaces of the context based on the one or more energy agents.

In general, another innovative aspect of the subject matter described in this disclosure may be embodied in methods that include rendering a context including one or more surfaces for display in a multi-dimensional space; detecting one or more events manipulating the one or more surfaces of the context; computing one or more energy agents for the one or more surfaces of the context based on the one or more events; and applying a visual effect manipulating the one or more surfaces of the context based on the one or more energy agents.

Other implementations of one or more of these aspects include corresponding systems, apparatus, and computer programs, configured to perform the actions of the methods, encoded on computer storage devices.

These and other implementations may each optionally include one or more of the following features, such as that the one or more surfaces correspond to one or more DOM elements that are rendered for display via a web browser; determining agent-related information defined in association with the one or more DOM elements; computing one or more energy agents for the one or more DOM elements based on the agent-related information; computing a transformation of the one or more DOM elements in a multi-dimensional space based on the one or more energy agents; that applying the visual effect to the one or more surfaces includes applying the visual effect to the one or more DOM elements based on the transformation; generating a scene graph reflecting the manipulation of the one or more surfaces of the context; rendering the visual effect manipulating the one or more surfaces based on the scene graph using graphics hardware acceleration; interpreting one or more objectives for the one or more events; that the one or more energy agents are computed based at least on the one or more objectives; detecting the one or more events includes receiving a user input and determining one or more of a directionality and speed of the input; computing the one or more energy agents includes computing a movement vector for the one or more surfaces based on one or more of a directionality and speed of the input; placing the one or more surfaces in movement in a multi-dimensional space by applying the movement vector; determining a boundary threshold of the context; determining that one or more edges of the one or more surfaces has moved beyond the boundary threshold; computing a counter force vector for the one or more surfaces based on a contextual attribute; applying the counter force vector to oppose the movement of the one or more surfaces; that the one or more events includes one or more of a touch event, a mouse pointer event, a keyboard event, and a motion gesture event; that the physics engine is further executable to receive agent-related information defined in association with the one or more DOM elements, and compute one or more energy agents for the one or more DOM elements based on the agent-related information; that the physics engine is further executable to compute a transformation of the one or more DOM elements in a multi-dimensional space based on the one or more energy agents and the rendering engine is further executable to apply the visual effect to the one or more DOM elements based on the transformation; a surface translation engine, executable by the one or more processors, to generate a scene graph reflecting the manipulation of the one or more surfaces of the context; that the rendering engine is further executable to render the visual effect manipulating the one or more surfaces based on the scene graph using graphics hardware acceleration; an input engine to interpret one or more objectives for the one or more events; that the one or more energy agents are computed based at least on the one or more objectives; an input engine to receive, via the interaction engine, user input and to determine one or more of a directionality and speed of the input; and that the physics engine is further executable to compute the one or more energy agents by computing a movement vector for the one or more surfaces based on one or more of a directionality and speed of the input.

These implementations are particularly advantageous in a number of respects. For instance, the technology described herein exposes application programming interfaces (APIs) and other features that can be used for the development of feature-rich web applications without requiring the use of plug-ins and browser extensions; provides a new user interface experience for web applications, including the ability to efficiently and seamlessly transition and/or morph between interfaces and/or interface elements by translating surfaces in three dimensional (3D) space from one layout into another layout; and can leverage APIs providing direct access to GPU hardware acceleration and primitives to efficiently and smoothly translate surfaces (e.g., DOM elements) in 2D and 3D space. It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIG. 17 illustrates a specification for a renderable context.

DETAILED DESCRIPTION

Figure 1:
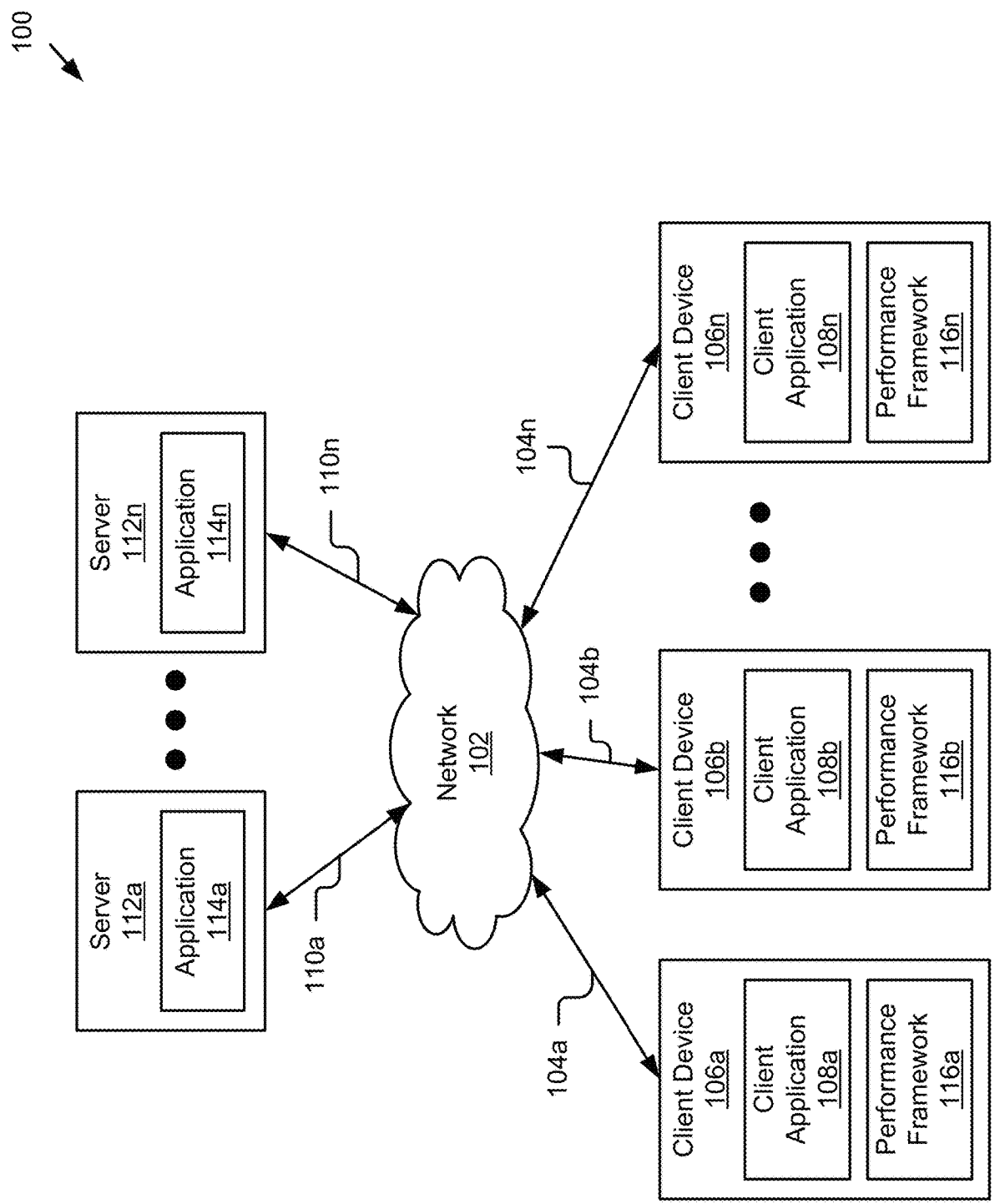
FIG. 1 is a block diagram illustrating an example system for efficiently manipulating surfaces in multi-dimensional space using energy agents.

The performance technology described herein can translate surfaces as the result of one or more simulated kinematic forces acting upon them. These kinematic forces can, in some cases, be generated via the conversion of control inputs into energy vector agents with magnitude and/or directionality. An observer/user, which can be a person providing control inputs using a pointer device, a touch surface, open-air gesture device, etc., can view the surfaces via viewport. The viewport acts like a window for viewing into a multi-dimensional (e.g., 3D) space where the surfaces are rendered and translated. The viewport may be fixed or may be translated by the performance technology independent of or in conjunction with the surfaces viewable via the viewport. In some implementations, the viewport may correspond to the surface that coincides with either a screen of the device being used (e.g., a smartphone, tablet, television, projector, etc.) or a window or sub-window displayed on such a device.

The surfaces can be rendered and displayed within the viewport. Surfaces include documents or document fragments. Example surfaces include, but are not limited to, stylized HTML elements (e.g., divs, spans, tables, etc.), images, and videos. The surfaces may or may not be displayed within the viewport. If a surface is "off-screen", it may still exist but not be visible and not require computation to render it. Every surface, including the viewport, can be arbitrarily translated to anywhere else in the multi-dimensional space and every one of these surfaces can have their translation impacted by the calculations produced by the control inputs.

The performance technology, which may be embodied, at least in part, by the performance framework discussed herein, can convert the control inputs (also referred to herein as inputs) into a series of energy agents with direction and magnitude. Example inputs that can be used as a source for computing the energy agents include, but are not limited to (1) touch screen gestures (e.g., swipes, taps, pinches, etc.); (2) pointer device inputs (e.g., mouse inputs like click, drag, etc.), (3) keyboard inputs (e.g., arrow up, down, left, right, etc.), and (4) motion gesture system inputs (e.g., 3D point clouds computed by Microsoft Kinect, LeapMotion, etc). The energy agents include vectors having magnitude and/or directionality. The energy agents may emulate forces like acceleration, friction, tension, elasticity, gravity, torque, thrust, drag, damping, greasing, etc. For instance, example energy agents may include, but are not limited to, acceleration in a first direction, friction in a second dimension, grease and damping. These simulated forces may correspond to real-world phenomena such as a spring, friction, drag, magnet, motor (applied force), etc. However, these kinematic forces are not limited to real-world forces and approximations thereof, and may include idealized forces or imaginary forces. The usage of idealized and imaginary forces can be used to create novel effects that are supernatural but cognitively consistent across the entire system of surfaces subject to such forces.

The application of these energy agents by the performance technology to a surface may cause one or more surfaces to translate in multi-dimensional space in accordance with the summation of the applied energy agents. For example, the movement of a finger on a touch screen in a first direction may be converted directly into energy vector agents corresponding to applied force in that first direction. In addition to the application of energy agents to surfaces, energy agents may also be applied to the viewport.

Different kinematic effects can be applied to the surfaces by applying multiple energy agents to a surface. In addition, energy agents may be produced programmatically, without and/or in conjunction with the receipt control inputs, to create kinematic animations of the surfaces or modify the behavior of those surfaces in the presence of an applied force. For example, a friction energy vector agent may be applied to surface and activated when a force is applied to that surface. An applied force agent in a first direction could activate a friction agent in a second direction opposite to the first direction. Energy can be opposing or complementary and more than two can be applied to a surface at one time. This can result in an effect in a wide range of sophisticated effects, such as torque on a surface anchored to a point or skidding on a slippery surface when a first applied force is added in a first direction to that surface and a second applied force is added to that surface in a second direction differing from the first direction, but not opposite to it, while that surface is still under the influence of the force agents acting in the first direction.

Although various implementations are described herein within the context of web browsers, it should be understood that these and other implementations may also apply to other software applications, including for example, operating systems, in which access to Graphics Processing Unit (GPU) rendering and GPU primitives for allowing translation of surfaces in 3D space is made available. In addition, while the performance framework 116 (e.g., see FIG. 1) is described, in various implementations, as interacting with a rendering engine 230 (e.g., see FIG. 2B) and/or DOM of a web browser, it should be understood that other technologies, such as Web GL, Open GL, or other technologies may also be applicable and be used.

FIG. 1 is a block diagram of an example system 100 for efficiently manipulating surfaces in multi-dimensional space using energy agents. The illustrated system 100 includes client devices 106a . . . 106n and servers 112a . . . 112n, which are communicatively coupled via a network 102 for interaction with one another. For example, the client devices 106a . . . 106n may be respectively coupled to the network 102 via signal lines 104a . . . 104n, and may respectively include client applications 108a . . . 108n and performance frameworks 116a . . . 116n. The servers 112a . . . 112n may be respectively coupled to the network 102 via signal lines 110a . . . 110n. The use of the nomenclature "a" and "n" in the reference numbers indicates that the system 100 may include any number of those elements having that nomenclature.

The network 102 may include any number of networks. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, peer to peer (P2P) networks, close proximity communication networks (e.g., Bluetooth®, NFC, etc.), various combinations thereof, etc.

Figure 2A:
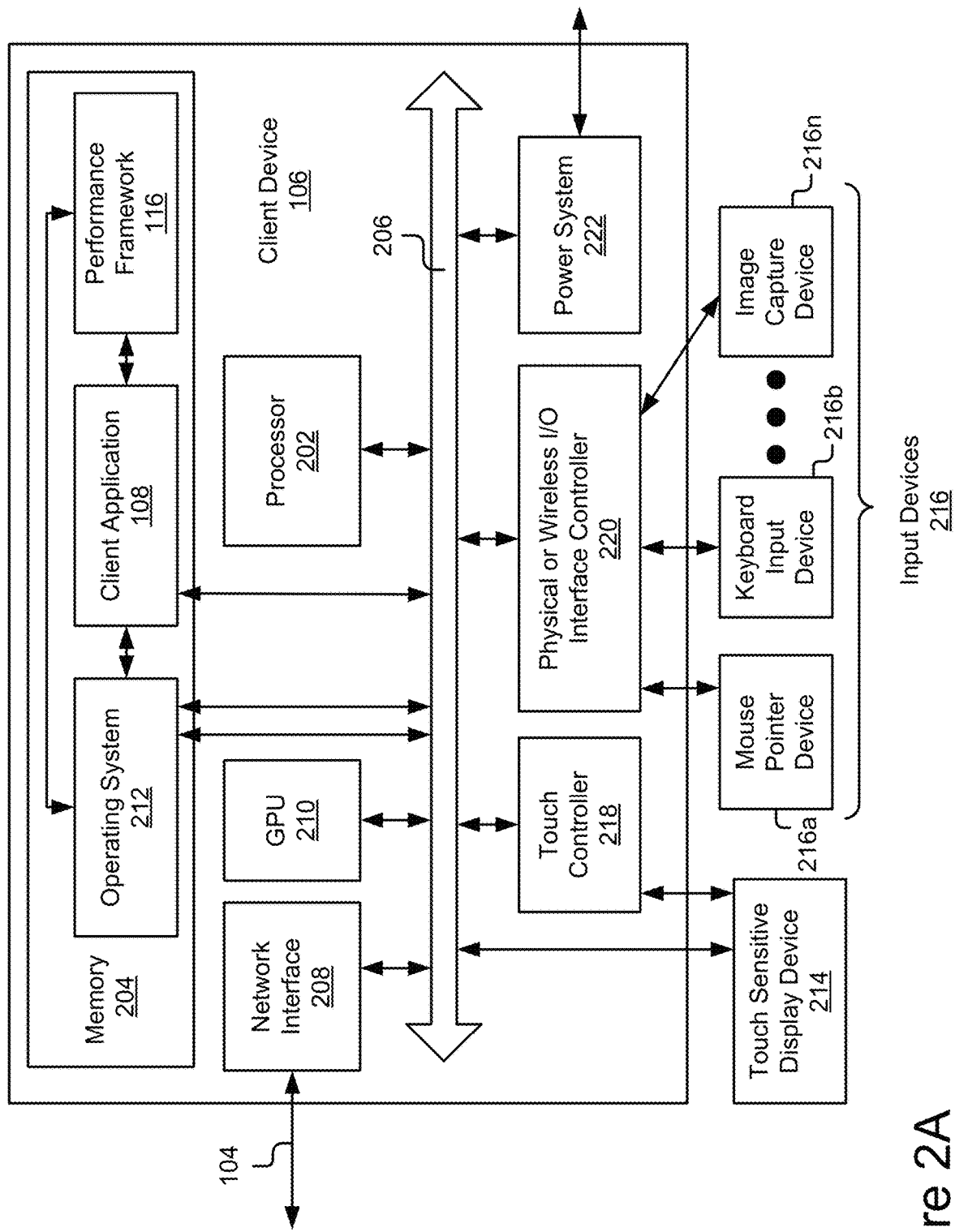
FIG. 2A is a block diagram illustrating an example client device.

The client devices 106a . . . 106n (also referred to individually and collectively as 106) are computing devices having data processing and communication capabilities. In some implementations, a client device 106 may include a processor (e.g., virtual, physical, etc.), a memory, a power system, a network interface, a GPU, a touch controller, a physical or wireless I/O interface controller, a display device, an input device as shown in FIG. 2A, and/or other software and/or hardware components, including, for example, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones, tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices.

In the depicted implementation, the client devices 106a . . . 106n respectively contain instances 108a . . . 108n of a client application (also referred to individually and collectively as 108) and instances of a performance framework 116a . . . 116n (also referred to individually and collectively as 116). The client application 108 and the performance framework 116 may be storable in a memory (e.g., memory 204 as shown in FIG. 2A) and executable by a processor (e.g., processor 202 as shown in FIG. 2A) of a client device 106, implementable using a hardware solution (e.g., ASICs, field programmable gate arrays), a combination of the foregoing, etc.

The client application 108 may include a browser application that can retrieve and/or process information hosted by one or more entities of the system 100 (for example, the servers 112) and can present the information on a display device (e.g., touch sensitive display device 214 as shown in FIG. 2A) on the client device 106. The performance framework 116 is configured to efficiently manipulate surfaces in multi-dimensional space using energy agents in cooperation with the client application 108, an operating system, and/or other components. In some implementations, the performance framework 116 may determine the state of physics for a surface and map it to the state of the scene, optimize the state of the scene, and then provide the state of the scene to the rendering engine 230 (e.g., see FIG. 2B-D) to be mapped to a corresponding DOM representation. Additional functionality and/or description of the client application 108 and the performance framework 116 are discussed in further detail elsewhere herein.

The servers 112a . . . 112n (also referred to individually and collectively as 112) may each include one or more computing devices having data processing, storing, and communication capabilities. For example, a server 112 may include one or more hardware servers, server arrays, storage devices and/or systems, etc. In some implementations, the servers 112a . . . 112n may include one or more virtual servers, which operate in a host server environment and access the physical hardware of the host server including, for example, a processor, memory, storage, network interfaces, etc., via an abstraction layer (e.g., a virtual machine manager).

In the depicted implementation, the servers 112a . . . 112n include applications 114a . . . 114n (also referred to individually and collectively as 114) operable to provide various computing functionalities, services, and/or resources, and to send data to and receive data from the other entities of the network 102, such as the client devices 106. For example, the application 114 may provide functionality for user account management, internet searching; social networking; web-based email; word-processing; banking; finance; blogging; micro-blogging; photo management; video, music and multimedia hosting, distribution, and sharing; business services; news and media distribution; any combination of the foregoing services; etc. It should be understood that the application 114 is not limited to providing the above-noted services and may include other network-accessible services.

The applications 114 may transmit electronic files and/or data embodying the services they provide to the client devices 106 for rendering by the client application 108 operable thereby. In some implementations, the electronic files and/or data streams may be formatted using a markup language(s) (e.g., HTML, XML, etc.), style sheet(s) (e.g., CSS, XSL, etc.), graphic(s) (e.g., PNG, JPG, GIF, etc.), and/or scripts (e.g., JavaScript, ActionScript, etc.), and the client devices 106 may interpret and/or execute the electronic files and/or data streams and render an interactive Web User Interface (WUI) for presentation to users on a display device (e.g., touch sensitive display device 214 as shown in FIG. 2A).

It should be understood that the system 100 illustrated in FIG. 1 is representative of an example system for efficiently applying visual effects to surfaces, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system may be integrated into to a single computing device or system or additional computing devices or systems, etc.

FIG. 2A is a block diagram of an example client device 106, which includes various hardware and/or software components. As depicted, the client device 106 may include a processor 202, a memory 204, a network interface 208, a GPU (graphical processing unit) 210, a touch controller 218, a physical or wireless I/O interface controller 220, a power system 222, a touch sensitive display device 214, and one or more input devices 216a . . . 216n (also referred to individually and collectively as 216), which may be communicatively coupled by a communication bus 206. The client device 106 depicted in FIG. 2A is provided by way of example and it should be understood that it may take other forms and include additional or fewer components without departing from the scope of the present disclosure.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (e.g., the touch sensitive display device 214), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the client device 106 including, for example, the memory 204, the network interface 208, the GPU 210, the touch controller 218, the physical or wireless I/O interface controller 220, the power system 222, the touch sensitive display device 214, and the input devices 216.

The memory 204 may store and provide access to data to the other components of the client device 106. In some implementations, the memory 204 may store instructions and/or data that may be executed by the processor 202. For example, as depicted, the memory 204 may store an operating system 212, the client application 108, and the performance framework 116. The memory 204 is also capable of storing other instructions and data, including, for example, hardware drivers, other software applications, databases, etc. The memory 204 may be coupled to the bus 206 for communication with the processor 202 and the other components of the client device 106.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a computing device or between computing devices, a network bus system including the network 102 or portions thereof, a processor mesh, a combination thereof, etc. In some implementations, the memory 204, the network interface 208, the GPU 210, the touch controller 218, the physical or wireless I/O interface controller 220, the power system 222, the touch sensitive display device 214, and/or the input devices 216 operating on the client device 106 may cooperate and communicate via a software communication mechanism implemented in association with the bus 206. The software communication mechanism can include and/or facilitate, for example, secure and/or unsecure inter-process communication, local function or procedure calls, remote procedure calls, an object broker, direct socket communication among software modules, UDP broadcasts and receipts, HTTP connections, etc.

The network interface 208 may include one or more interface devices for wired and wireless connectivity with the network 102 and the other entities and/or components of the system 100 including, for example, the servers 112, etc. For instance, the network interface 208 may include, but is not limited to, CAT-type interfaces; wireless transceivers for sending and receiving signals using Wi-Fi™; Bluetooth®, cellular communications, etc.; USB interfaces; various combinations thereof; etc. The network interface 208 may be coupled to the network 102 via the signal line 104 and may be coupled to the other components of the client device 106 via the bus 206. In some implementations, the network interface 208 can link the processor 202 to the network 102, which may in turn be coupled to other processing systems. The network interface 208 can provide other connections to the network 102 and to other entities of the system 100 using various standard communication protocols, including, for example, those discussed elsewhere herein.

The GPU (i.e., graphical processing unit) 210 may render one or more images for display by performing various input/output, logical, and/or mathematical operations. The GPU 210 may have various computing architectures to process data signals including, for example, a parallel processing architecture, a complex instruction set computer (CISC) architecture, a reduced instruction set computer (RISC) architecture, and/or an architecture implementing a combination of instruction sets. The GPU 210 may be physical and/or virtual, and may include a single core or plurality of processing units and/or cores. In some implementations, the GPU 210 may be capable of generating and providing electronic display signals to the touch sensitive display device 214, supporting the display of images, capturing and transmitting images, performing complex tasks including various types of feature extraction and sampling, etc. In some implementations, the GPU 210 may be coupled to the memory 204 via the bus 206 to access data and instructions therefrom and store data therein. In some implementations, the GPU 210 may perform its acts and/or functionalities as described herein in cooperation with the processor 202 and/or one or more components of the client device 106. For instance, the bus 206 may couple the GPU 210 to the processor 202 and other components of the client device 106 including, for example, the memory 204, the network interface 208, the touch controller 218, the physical or wireless I/O interface controller 220, the power system 222, the touch sensitive display device 214, and/or the input devices 216. In some implementations, the GPU 210 may be integrated with the processor 202.

The touch sensitive display device 214 is a touch-screen display (e.g., OLED, AMOLED, etc.) capable of receiving input from one or more fingers of a user. For example, the touch sensitive display device 214 may be a capacitive touch-screen display capable of detecting and interpreting multiple points of contact with the display surface. The touch sensitive display device 214 may be managed by a touch controller 218, which relays and/or passes the inputs/signals received on the display device 214 to one or more components of the client device 106 including, for example, the GPU 210, the processor 202, the memory 204, the network interface 208, etc., via the bus 206. The touch sensitive display device 214 may include one or more transparent touch sensitive layers that are integrated with the touch sensitive display device 214 and capable of sensing input/gestures from the one or more fingers of a user. While a touch sensitive display is described, it should be understood that a conventional display device (e.g., LCD, projector, TV, etc.) is also applicable and may be used.

The input devices 216a ... 216n (also individually and collectively referred to as 216) may include motion-detecting input devices, pointer devices, keyboards, audio input devices, other touch-based input device, etc. For example, the input devices 216 may include a touch-screen, microphone, a front facing camera, a rear facing camera, and/or motion sensors, etc. In particular, as depicted in the figure, the input devices 216 may include a mouse pointer device 216a, a keyboard input device 216b, an image capture device 216n, etc. The input devices 216 may be managed by a physical or wireless I/O interface controller 220, which relays and/or passes the inputs/signals received from users via the input devices 216 to one or more components of the client device 106 including, for example, the touch controller 218, the touch sensitive display device 214, the GPU 210, the processor 202, the memory 204, the network interface 208, etc., via the bus 206.

The input devices 216a ... 216n and/or the touch sensitive display device 214 may be configured to receive a variety of control inputs (e.g., gestures) from users. Non-limiting examples of the inputs may include a single touch gesture (e.g., swipe, tap, flick, stroke, etc.), a multiple touch gesture (e.g., zoom, grab, etc.), a mouse click, a keyboard stroke, a voice gesture (e.g., speech to text, voice command, etc.), a motion gesture (e.g., hand signal, body signal, eye movement, etc.), etc.

The power system 222 includes a power source and/or components for supplying electrical power to the components of the client device 106. As depicted, the power system 222 may be coupled to the bus 206 to provide power to the hardware components coupled thereto. In some implementations, the power system 222 may include one or more of a regulated power supply (e.g., AC power supply), a transformer (AC/DC converter), one or more energy storage devices (e.g., a rechargeable battery), wiring, etc.

Figure 2B:
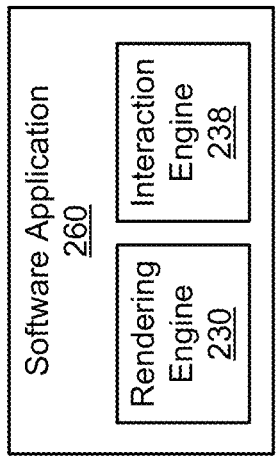
FIG. 2B is a block diagram illustrating an example software application.

FIG. 2B is a block diagram of an example software application. In some implementations, the software application 260 represents the client application 108 and/or the operating system 212, although the software application may also represent other types of software like native applications. As depicted, the software application 260 may include a rendering engine 230 and an interaction engine 238.

The rendering engine 230 may include software and/or logic for processing content and formatting information for display. The rendering engine 230 can coordinate visual effects (e.g., surface transformations, cosmetic effects, etc.) to be applied to a renderable context with the control inputs provided by a user for the context so the experience is responsive and satisfying to the user.

In some instances, the rendering engine 230 may generate a rendering from scene data, which can be displayed on a display device, such as the touch sensitive display device 214. For example, the rendering engine 230 may receive a scene graph from the surface translation engine 236 (e.g., see FIGS. 2C and 2D), in which necessary matrices transformations have already been calculated. In some instances, geometric, modeling, camera, and/or other transforms may already be performed by the surface translation engine 236 based on information received from the physics engine 234 and/or the input engine 232 (e.g., see FIGS. 2C and 2D). This can reduce or eliminate the amount of matrix multiplication (e.g., translation, scaling, rotation, projection, etc.) that needs to be performed by the rendering engine 230, thus substantially improving the overall performance (e.g., speed and visual quality) of the software application 260. As a further example, a CPU (e.g., processor 202) may handle computing the transformation matrices to place individual surfaces from scene data, and a GPU (e.g., GPU 210) uses those matrices, along with texture data, to actually place the pixels within. For instance, the surface translation engine 236 may allow for efficient computation of the individual transformation matrices by utilizing high-level scene-specific data to eliminate the computation of some matrices (e.g., low-level scene-specific data) and re-using various pre-computed components.

The rendering engine 230 can utilize APIs that provide direct access to GPU hardware acceleration and primitives for efficient translation of objects (e.g., surfaces, documents, document fragments, etc.) in multiple dimensions (e.g., 2D, 3D, etc.). For example, the rendering engine 230 may utilize a graphics stack to efficiently rasterize vector graphics into raster images (e.g. pixels) for display via a screen. Using the scene graphs generated and provided to the rendering engine 230 by the surface translation engine 236 (e.g., see FIGS. 2C and 2D), the rendering engine 230 can render the content sufficiently fast (e.g., @60 fps) so that the animations being applied to the viewable surfaces are smooth and seamless to the viewer, and undesirable artifacts (e.g., jitter) are eliminated.

The rendering engine 230 may process the scene graph progressively from the roots up through to the leaves, and apply the matrices corresponding to nodes of the scene graph to associated DOM elements that represent those items on the display. For nodes that do not have corresponding DOM elements (e.g., <divs>), the rendering engine 230 may interact with the DOM to create them. For nodes that have been deleted, the rendering engine 230 may delete the corresponding DOM elements. In some instances, the scene graph may map the nodes of the scene graph with the DOM elements using unique IDs, and the rendering engine 230 can use these IDs to identify the corresponding DOM elements.

In some implementations, the rendering engine 230 may process markup content like HTML, XML, etc., apply presentational instructions encoded in CSS, XSLT, etc. to the markup content, interact with a JavaScript Interpreter to execute various objects, methods, etc., that may manipulate the content, and then provide the formatted content for display to a user on the display device 214.

Figure 2C:
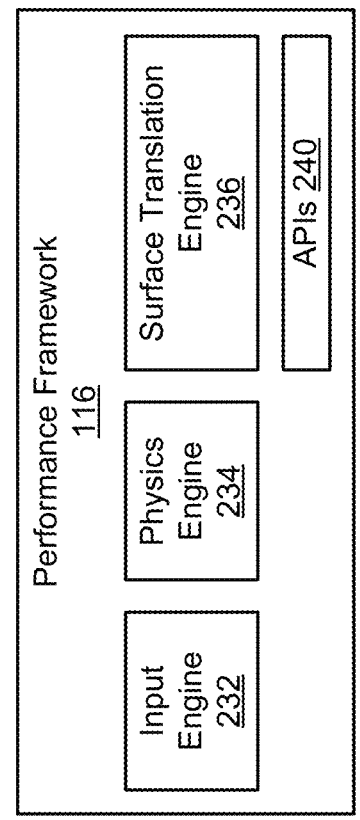
FIG. 2C is a block diagram illustrating an example performance framework.
Figure 2D:
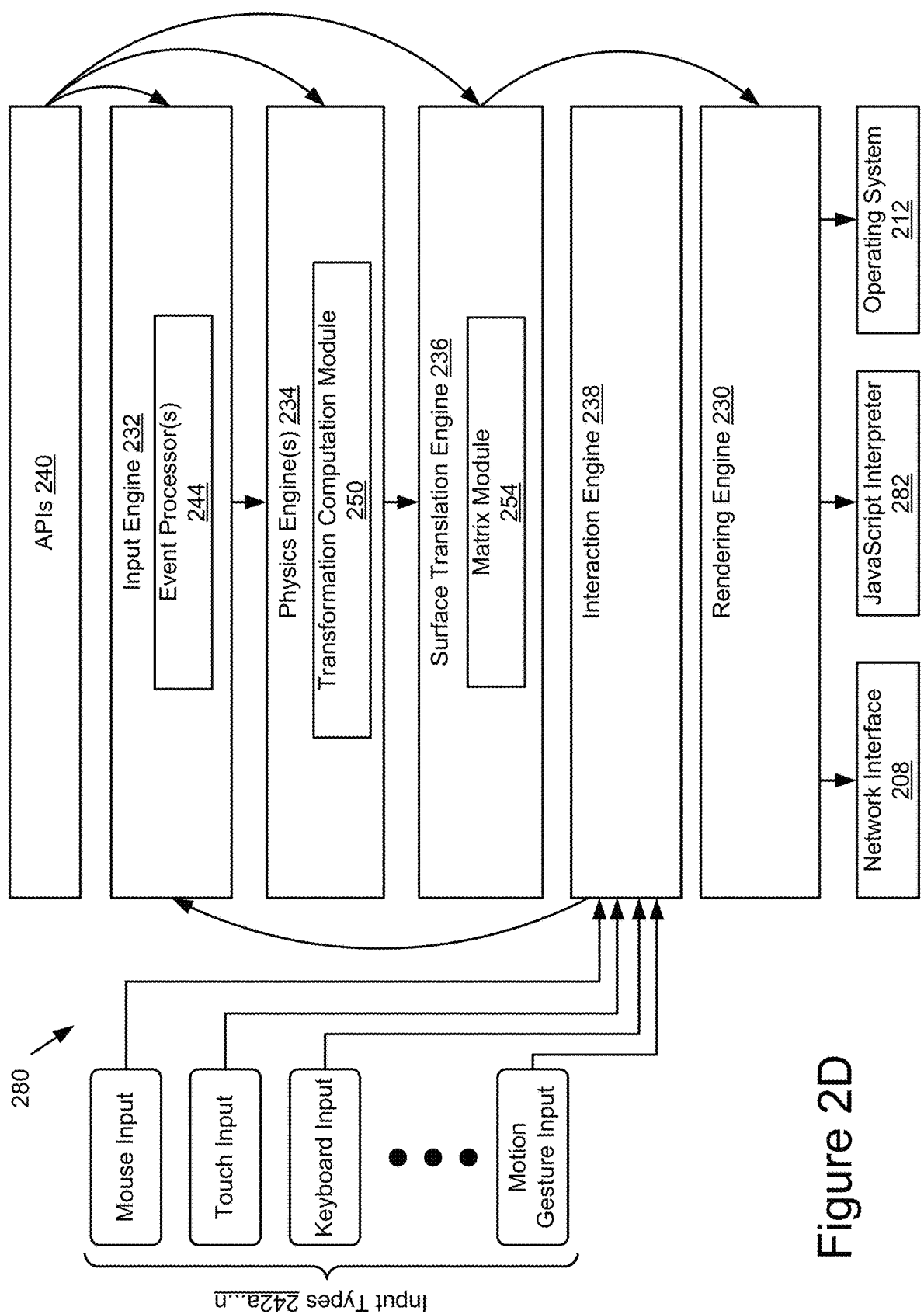
FIG. 2D is a block diagram illustrating various structure, acts, and/or functionality of the example performance framework.

As shown in FIG. 2D, the rendering engine 230 may be coupled to the network interface 208 to send and receive data (e.g., via the network 102). The rendering engine 230 may be coupled to the JavaScript Interpreter 282 to interpret JavaScript objects configured to handle and process events, perform physics-related calculations, generate scene graphs, control various aspects of the software application 260, communicate with other entities (e.g., asynchronously), manipulate the content being process for display (e.g., DOM elements, etc.), etc. The rendering engine 230 may be coupled to the operating system 212 to store and access files via a file system, access one or more databases, utilize various APIs, etc., receive instructions, etc.

The interaction engine 238 may include software and/or logic for receiving and interpreting user input from the input devices 216. The interaction engine 238 may be coupled to receive control inputs from touch controller 218 that are input by users via the touch sensitive display device 214 and/or the input devices 216. In some implementations, the touch controller 218 may determine and provide positional information associated with each point of contact with the touch sensitive display device 214 to the interaction engine 238. The interaction engine 238 may interpret the inputs and/or provide data describing the inputs to the input engine 232.

FIG. 2C is a block diagram of an example performance framework 116, which includes an input engine 232, a physics engine 234, a surface translation engine 236, and APIs 240. FIG. 2D is a block diagram illustrating various structure, acts, and/or functionality of the example performance framework 116. The input engine 232, the physics engine 234, the surface translation engine 236, and/or the APIs 240 may be communicatively coupled by the bus 206 and/or the processor 202 to one another and/or the other components 204, 208, 210, 214, 216, 218, 220, and/or 222 of the client device 106. In some implementations, one or more of the input engine 232, the physics engine 234, the surface translation engine 236, and/or the APIs 240 are sets of instructions executable by the processor 202 to provide their functionality. In other implementations, one or more of the input engine 232, the physics engine 234, the surface translation engine 236, and/or the APIs 240 are stored in the memory 204 of the client device 106 and are accessible and executable by the processor 202 to provide their functionality. In any of the foregoing implementations, the input engine 232, the physics engine 234, the surface translation engine 236, and/or APIs 240 may be adapted for cooperation and communication with the processor 202 and other components of the client device 106.

The input engine 232 includes software and/or logic for receiving and processing control inputs provided by a user interacting with a rendered context. A renderable context can include one or more objects that are capable of interacting with one another and that could affect another's behavior within the context. The renderable context and/or objects are also interchangeably referred to herein in some cases as surfaces. In some implementations, a rendered context may be a viewport (e.g., a window, a frame, an HTML container element, etc.) and may include elements within it, such as scroll views, containers, images, media objects, etc. The elements may be visible or non-visible to a viewer. In a 3D virtual space, a rendered context may be a heads-up display that is presented to a user on top of another context that is 3D interactive working space. Each rendered context may be associated with one or more instances of a physics engine 234, as discussed in further detail elsewhere herein.

In some cases, a final specification for a renderable context can be produced using a renderable object of the performance framework 116. The renderable object may include a render object that accepts a render specification as an input. The render specification may include:

Entity (e.g., surface) identifier

Transform definition (an object with the following keys)
        target: mandatory (what to apply the transform on)
        transform: the transformation matrix (use framework to help generate)
        opacity: opacity to apply
        size: treat everything inside target as a single surface with defined size
        origin: [0 . . . 1, 0 . . . 1] coordinate to use for zero point expressed as percentage offsets (i.e. [0, 0]=top-left, [0.5, 0.5]=center, [1, 0]=top-right), [0.5, 0.5, 0]=center front of cube, [0.5, 1, 1]=center bottom of rear of cube, etc.

Array of other render specs

The final specification can be used by the surface translation engine 236 to build a corresponding scene graph. As a further example, a renderable context may be a window that includes a title bar, action buttons, and content area. A final specification 1700 that can be produced may have the structure depicted in FIG. 17. As shown, the contents of the window may have various 'transform' effects applied during the lifecycle of the window. In the context of a web browser, a rendered context may default to an origin of [0, 0] when instantiated to target an HTML div.

In some cases, the performance framework 116 includes a scene software object that allows a developer to conveniently define the scene of a renderable context. For example, representative code for defining a scene may include:
    var FamousScene=require('famous/Scene');
    var myScene=new FamousScene(sceneDef);
    myContext.contentFrom(myScene);
where sceneDef may be a software object representing the structure of a scene. In the web browser context, the structure of the sceneDef may be scene that may share characteristics with a scene graph and/or scene graph node. In some cases, transforms may be defined as matrices like
    transform:
        rotateY: 0.1
        scale: [2, 2, 1]
        translate: [0, −10, 0]
The format of a transform may specify a desired transform, which may be based on applying a set of canonical transforms in order. The scene software object may interpret that definition and generate the transformation matrix to produce that effect.

As a further example, a developer could define a scene using a serialization language like YAML, JSON, etc., and process/minify it for runtime by generating optimal code for a JavaScript object that produces a corresponding scene graph.

Returning to FIG. 2D, the inputs received and processed by the input engine 232 may correspond to various gestures made by a user using one or more input devices 216, as described elsewhere herein. As depicted, the inputs types 242a . . . n may include mouse inputs, touch inputs, keyboard inputs, motion (e.g., open-air) gesture inputs, etc. In a further example, the inputs may be touch or motion-based inputs respectively captured by the touch sensitive display device 214 and the image capture device 216n. As a further example, the representative inputs may include, but are not limited to, a tap, swipe, pinch, rotation, hand motion, body motion, etc. The interaction engine 238 may capture the inputs and send them to the input engine 232 for processing. In some instances, a surface rendered for display may be notified of an event by the interaction engine 238, and may pipe the event to the input engine 232 for processing.

How various events are handled for a given context, and whether or not the events affect the context, may be defined in association with the context. For example, an interface designer may predetermine the effects certain user gestures will have on the rendered context and the elements it includes, and can add corresponding event emitters (e.g., using JavaScript) to the context that trigger processing of associated events by the input engine 232 when such events are detected relative to the context.

In some implementations, events can be abstracted as streams and based off of a software object configured to handle the events, such as an event emitter (e.g., a node.js EventEmitter). In some implementations, to handle a particular event, a context, its objects, etc., may implement an emit method, which may be called by the event emitter to provide notification that an event has occurred. The event emitter may implement a pipe method, which adds a given target to a list of one or more targets to which an event will be piped to, and may implement an unpipe method to remove the target from the list. An event handler library may also be used in conjunction with event emitters to process the events. The event emitter may emit an event, and the event data for that event may be dispatched to a handler, for instance, by calling an on(eventName, handler) function with a corresponding argument. For example, the emit( ) method may be used to emit an event, and the on( ) function may attach a handler to an event (which can be dispatched on emit). The pipe( ) method may designate downstream event handler to emit events to. An event handler may be designated to be used for input and output. In some cases, if both the functions (e.g., input and output) are desired, then two separate event handlers may be required and used. An unbind(eventName, handler) method may be called to step dispatching events to the handler that was added using the on method. Events may originate from various event sources including events from the viewport, events from the performance framework 116, and events from the surfaces (e.g., DOM elements representing the surfaces). Remote events may also be received by a local instance of the performance framework 116 from one or more remote instances of the performance framework 116, allowing for a multi-screen implementation.

In some instances, the interaction engine 238 of a web browser, operating system, or other application may capture an event with respect to one or more contexts, which may trigger the event listener defined in association with the context(s), and the event may be piped to the input engine 232, where it is processed and then output to one or more instances of the physics engine 234 that correspond to the context(s).

As a further example, an input received from the interaction engine 238 may, in some cases, be received as an HTML event and may be tied to one or more surfaces. The HTML event may include positional information associated with the user input and information about what target surface(s) are affected. As an example, a given surface in an HTML document rendered for display, and user inputs received corresponding with that surface may be captured upon input by the interaction engine 238 and piped to the input engine 232 for processing.

The input engine 232 can consider the input history to determine how to process the current input. In some implementations, the input engine 232 may interpret and integrate a current input (e.g., low-level event) with a set of previous inputs reflecting higher level event (e.g., a rotate gesture, zoom gesture, a combination of the foregoing, etc.) based on the properties of the low-level event. For instance, the input engine 232 may determine whether the input event is a new touch or a continuation of a series of previous touches. This determination can be based on the connection between the properties of the previous input(s) received and the current input being processed, including movement (target surface, difference in position between inputs, continuity between inputs, time elapsed between inputs, etc.). As a further example, for a series of raw inputs that collectively describe a finger swipe across a touchscreen, the input engine 232 can identify the series of raw inputs as forming the swipe. In this example, the event state for the first input in the series may be determined as new, and the event states for the subsequent inputs in the series may be determined as continuous with the first input.

The input engine 232 may include one or more event processors 244 capable of processing the input events received from the interaction engine 238. In some implementations, the input engine 232 may include various sets of one or more event processors 244 that are each capable of processing different types of events. Representative event processors 244 may include, but are not limited to gesture processors like a pinch processor for processing pinch-to-zoom gestures, a touch processor for processing touch and tap gestures, a touch sync for synchronizing events received from multiple sources, a swipe processor for processing swipe gestures, a hand motion gesture processor for processing one or more hand motions, etc. As a further example, an event handler can receive a low-level event emitted by an event source, pipe it to one or more processors 244, which can then ignore the event, process the event and pipe higher-level events downstream, respond to the event, etc.

In some implementations, one or more of the event processors 244 may be an input tracker that computes input vectors for each input received. The input vectors may represent the position and/or magnitude of the input. For instance, for a swipe gesture with one finger, the input tracker may compute vectors describing the position and magnitude of the finger as it swipes across the touch-sensitive surface. For a rotate gesture with two fingers, the input tracker may compute vectors describing the position and magnitude of each of inputs corresponding to the fingers as they move along curved trajectories on the touch-sensitive surface. The input tracker may pipe the input vectors to one or more event processors 244 for further processing, which may interpret the input vectors to determine the objective(s) the user is attempting to accomplish (e.g., zoom, rotate, pinch, select, etc.). For instance, a rotate gesture input may be handled by a rotate processor that considers the vectors of the two points of contact associated with the rotate event and determine tension and rotation parameters based thereon. In some instances, the input tracker may route the events to the proper sequence of one or more event processors 244 based on the properties of the events (e.g., input vectors, surfaces affected, other metadata, etc.). The event processors 244 can output data describing and quantifying the gesture (e.g., a zoom amount, pinch amount, select amount, etc.).

The processed events can be output by the input engine 232 to one or more of the physics engine instances 234 for processing and can then be rendered for display via corresponding rendered context(s). In particular, the input engine 232 can determine the position, velocity, time stamp, event-type, etc., for a given input/event and provide it to a corresponding instance of the physics engine 234. This can be done in (e.g., near) real-time so the physics engine 234 can model the changes to the surface(s) associated with the input, as discussed in further detail below. The input engine 232 may be coupled to one or more instances of the physics engine 234 to provide the event-related information, and may be coupled to the memory 204 to store and/or retrieve event-related information. During the lifecycle of a given rendered context, one or more instances of the physics engine 234 may receive and process a stream of energy agents for the context.

The physics engine 234 includes software and/or logic for computing visual effects (e.g., kinematic effects such as movements, translations, etc.) for a rendered context(s) and/or one or more of the objects associated with that context based on the associated energy agent(s) and/or events. An energy agent is configured to act on a rendered context and/or the objects of a rendered context. An energy agent may be computed in terms magnitude and/or directionality. For example, an energy agent may include one or more force vectors.

A rendered context may be associated with one to many instances of a physics engine 234, and a physics engine 234 may be associated with one to many rendered contexts. Thus, more than one instance of the physics engine may be initialized upon the loading of a viewport. The viewport may have more than one rendered context, and each of those contexts may be associated with the same instance of the physics engine 234 or a different instance. For example, the viewport may have a context for the camera/viewing surface associated with the viewport which can be panned around, rotated, etc., and have specific energy agents attached that give the camera its properties; a scroll view region that allows the user to scroll and select from different items (e.g., folders, images, videos, files, etc.) in a multi-dimensional space and has specific energy agents attached that give it properties such as a bounce-back once the end of a list of items has been reached, and main interaction region that allows the user to interact with the items in a multidimensional space which may have specific energy agents attached to provide that context with its own unique environmental properties. Each of these contexts may be interacted with independently from one another and the inputs associated with each of these contexts may be piped to different instances of the physics engine 234. In a further example, related contexts that are loaded on disparate client devices 106 may share the same physics context, and the instances of the physics engines 234 on those disparate devices 106 may be synchronized to provide this unified context. This allows users at different locations to control the same context rendered on the disparate devices 106.

Energy agents can be programmatic or user defined for a given context and/or one or more of its objects. The energy agents may affect the kinematics of the physics of an object in the physics engine 234. A given energy agent may be added to a rendered context, and the context may inform the agent to act on the context based on one or more triggering criteria (e.g., events, random or systematic timers, predetermined criterion, etc.). For example, using JavaScript, a developer could add one or more energy agent objects to a context (e.g., a <div> container) that define the virtual physical attributes of the environment.

Render agents may also be added to objects to add cosmetic effects to objects. Render agents are agents that can affect the rendering and/or display of the objects. For example, a pulse effect embodying a render agent may be producing using the following example code:

var myEffect=new PulseEffect({duration: 500});
var anotherEffect=new Transform(FM.rotateZ(0.1));
var someRenderable=new FamousSurface([300, 200],
 'Just an Example',
['exampleClass', 'anotherClass']);
mainCtx.contentFrom(myEffect).from(anotherEffect).
 from(someRenderable);

When added, energy agent objects may be associated with one or more instances of the physics engine 234, and the context may be configured to inform the energy agent objects to have their effects applied based on predetermined triggers. In some implementations, the performance framework 116 can signal the rendering engine 230 to notify the affected surfaces when a certain triggering criterion occurs, and the surfaces can then signal the associated instances of the physics engine 234 to process the energy agents that are also associated with the surfaces. The context may also provide to any associated instances of the physics engine 234 other information about context, such as its attributes (e.g., opacity, position, etc.) and/or the attributes of the objects associated with the context, such as its children elements. In further implementations, the physics engine 234 may obtain any information about the context and/or its associated elements from an API of the software application 260, such as a Document Object Model (DOM).

Energy agents can use one or more events as inputs when being processed by the physics engine 234. For instance, a given energy agent may represent the act to be performed when a certain gesture input by a user is received, and or may vary based on the attributes (e.g., velocity, position, etc.) of the input. Example energy agents may include a velocity energy agent that applies movement to a surface or set of surfaces when scrolled or panned, tracking energy agent that applies a tracking movement to a surface or set of surfaces when the user moves the controlling input (e.g., finger, hand, etc.) around the control region (e.g., touch sensitive surface), etc.

As a further example, the physics engine 234 may receive the velocity and position associated with an event that corresponds to a given surface/rendered context. From the surface, the physics engine 234 can compute the effect of the event on the surface relative to the other energy agent constraints that are associated with that surface. For instance, each time a finger presses and holds down on a surface displayed via the touch sensitive display device 214, and the surface has a tracking energy agent that says the surface should track the movement of the finger, the physics engine 234 computes the tracking effect the tracking energy agent has on the surface relative to any other constraints that may also govern the surface, such as boundary limitations, friction, drag, bounce back, etc. As the finger moves around the screen, the physics engine 234 is informed of the velocity and position of the finger and updates the surface with this movement based on the vector(s) associated with the tracking energy agent and relative to the other forces that are applicable to the surface. When the finger is removed from the screen, the input engine 232 ceases to provide events (e.g., touch vectors) to the physics engine 234 for that surface, and the physics engine 234 is thus informed that the surface is no longer being controlled by the input. At this point, the physics engine 234 allows the other energy agents associated with the surface to transition in and bring the surface to a steady state (which could be a static or dynamic state).

It should be understood that energy agents can, in some cases, act independently of input events. Stated differently, an agent might or might not respond to an input, but has an output, which can affect the state of an object. For instance, there can be certain energy agents added to a rendered context that define the environment of the context. As an example, a rotational energy agent may be added to a viewport to slowly rotate the objects (e.g., DOM elements) of the viewport about a center point at a predetermined rate, and after items are spun using a swipe by the user, the spinning motion may eventually returns back to that base rotational state and rate. In another example, a scroll view may include several scrollable elements. The scroll view may have two agents associated with it—a velocity agent and a drag agent. The velocity agent allows the elements to be scrolled quickly based on repeated, rapid user inputs, and the drag agent slows down the scrolling to give it a slowing effect between inputs. As a further example, suppose a user would like to move a few objects (e.g., DOM elements) in a viewport together and basically uses a grab gesture to tosses them into a pile in the viewport. The objects may have a sticky energy agent that adheres the objects together in the pile, and may have a gravity energy agent that opposes the sticky energy agent, causing some of the objects to unstick and fall. Additionally or alternatively, the viewport may have a vortex energy agent that causes all objects (e.g., DOM elements) to rotate around a center point when at steady state.

The physics engine 234 is capable of computing the dynamic state of a context over time. The physics engine 234 can determine how an object (e.g., a surface, etc.) of a context will be affected by events, energy agents, and transitions associated with that context, and can output data describing these effects to the surface translation engine 236, which can encapsulate these effects in a scene graph and output the scene graph to the rendering engine 230 for rendering and display to the user. In some implementations, the data output by the physics engine 234 can describe the energy agents at least in terms of transformation matrices describing how the corresponding object(s) are to be visually affected (e.g., transformed). These computations may be performed by a transformation computation module 250, which may include software and/or logic for computing such.

The surface translation engine 236 includes software and/or logic for applying translations and/or other visual effects to data reflecting object(s) associated with a renderable context (e.g., viewport) based on inputs, events, and/or transitions, and then feeds the data to the rendering engine 230 and GPU for rendering and display. The surface translation engine 236 may be coupled to the physics engine 234 and/or other components of the performance framework 116 (e.g., the input engine 232, the rendering engine 230, etc.) to receive surface-related information, such as corresponding input events, energy agent-related/transformation information, and transitions. The surface translation engine 236 may translate the objects based on the transformation information. In some implementations, the physics engine 234 may output position and velocity information associated with an object, which the surface translation engine 236 may then use to apply the corresponding translation. By way of example, the following code may be used by the surface translation engine 236 to receive and apply transformation information from the physic engine 234:

```
function getCurrentTransform( ) {
    var position = physicsEngine.getPosition( );
    var velocity = physicsEngine.getVelocity( );
    return Matrix.move(Matrix.skew(velocity, 0, 0), [position, 0, 0]);
}
```

The above code may produce the transform for a moving object that skews more the faster it moves.

In some implementations, the surface translation engine 236 may apply the translations and/or other visual effects by generating and manipulating a scene graph. A scene graph includes a data structure including nodes that describe the renderable content in the form of a tree structure, in which a parent node contains one or more children nodes, and the children nodes may further constitute parent nodes relative to the children nodes they contain, and so one and so forth. Each node of the scene graph may include positional, rotational, scaling, and/or geometrical information, etc., associated with that node, and may include such information in multiple dimensions (e.g., 2D, 3D, etc.), although it should be understood that any other attributes may also be included, such as opacity.

Below is an example scene graph generated by the surface translation engine 236 for a translucent surface placed next to another surface and the surfaces being rotated together:

```
[
  {
    transform: [1, 0, 0, 0, 0, 1, 0, 0, 0, 0, 1, 0, -100, 0, 0, 1],
    opacity: 0.5,
    target: 3
  },
  {
    transform: [0.707, -0.707, 0, 0, 0.707, 0.707, 0, 0, 0, 0, 1, 0, 0, 0, 0, 1],
    target: [
      4,
      {
        transform: [1, 0, 0, 0, 0, 1, 0, 0, 0, 0, 1, 0, 100, 0, 0, 1]
        target: 5
      }
    ]
  }
]
```

In the above example, the transformation matrices, in order, are: translate(−100, 0, 0), rotateZ(PI/4), and translate (100, 0, 0), which apply to entities (surfaces) with respective ids of 3, 4, and 5, where 3 is positioned 100 pixels to the left of the PI/4-radian rotation of 4 and 5, and 5 is positioned 100 pixels to the right of 4.

In some web browser-based implementations, the surface translation engine 236 may generate the scene graph by progressively applying the transforms beginning with the leaves and ending with the roots, and the rendering engine 230 may apply the scene graph to the DOM in reverse order.

When generating the scene graph, the surface translation engine 236 can format the data received from the physics engine 234, such as data describing applicable events, energy agent effects, and/or transitions, into a scene-graph compatible format and incorporate it. For instance, a change in position, rotation, scale, and/or geometry, etc., due to one or more energy agents may be calculated (e.g., as vectors) by the physics engine 234 and provided to the surface translation engine 236, which may reflect these changes in the node. The surface translation engine 236 may receive information about the rendered context and the one or more objects included therein, such as current position, rotation, scale, geometry, etc., from the rendering engine 230 (e.g., a DOM) and incorporate it into the scene graph. In some implementations, a location matrix can be computed based on scene graph data. The physics engine 326 may be used as a source to compute the location matrix, and the surface translation engine 236 may then apply this location matrix to one or more elements of a rendered context for translation.

The surface translation engine 236 may generate its own distinct scene graph, which it can then provide to the rendering engine 230. The rendering engine 230 can use GPU accelerated rendering to process the scene graph and produce the surface translations and/or other effects in the viewport (e.g., browser window) without having to substantially reprocess the scene graph. This can yield significant performance improvements and eliminate unwanted visual artifacts when rendering objects, for example, in a web browser context. In some cases, the nodes of the scene graph are not directly associated with the items being visually displayed, but are rather representations of those items and can be independently transformed by the surface translation engine 236. This can allow the performance framework 116 to be over a magnitude more efficient than when the elements are directly associated with the items being visually displayed and the transformations are processed by the rendering engine 230 itself.

In some implementations, the rendering engine 230 may signal the surface translation engine 236 to output a scene graph (e.g., based on the occurrence of one or more events) for a given renderable context. In some implementations, the surface translation engine 236 may provide the scene graph to the rendering engine 230 responsive to receiving information and/or input events from the physics engine 234 and/or the input engine 232. Other variations are also contemplated.

The surface translation engine 236 may include a matrix module 254, which includes software and/or logic for applying transforms to the scene graph and preparing for output to the rendering engine 230. In some implementations, the matrix module 254 can apply a transform to one or more of the nodes of the scene graph. For instance, the matrix module 254 can traverse from the leaves of the scene graph, through any successive the child nodes, to the limbs of scene graph, and apply transforms along the way as appropriate. As a further example, the matrix module 254 can transform a parent node and/or one or more children nodes based on the inputs, energy agents, and/or transitions that are applicable to those nodes. In some cases, a parent node may include a group or array of children nodes and the matrix module 254 can transitively transform the group or array by virtue of the relationship. This can be further extended to grandchildren nodes, great-grandchildren nodes, etc. This can allow all of the depicted surfaces in a renderable context to be transformed together. The actual transformation of each of the nodes may vary in some cases based on the position of the visible surfaces mapped to those nodes. In some cases, various parent and/or child nodes may be transformed independently.

When applying a transform, the matrix module 254 may apply the current state of the parent object, as determined by the physics engine 234, to each child/sub-object. As a further example, assume a cube is to be placed in rotation. In an arbitrary frame, one example transform would be to rotate the cube around an axis by a certain number of degrees. The matrix module 254 can calculate the transform based on a rotational energy agent and determine a location matrix based thereon. In evaluating the node corresponding to the cube, the matrix module 254 may determine that the cube includes an array of six surface represented by six child nodes. The matrix module 254 can then apply the rotational transform to these child nodes. In some implementations, the child nodes may map to corresponding element IDs included in the DOM. In one example, the output generated by the surface translation engine 236 including the matrix module 254 may include no nesting information and just final transform matrices, opacities, sizes, and surface IDs that are to receive the transformations. The surface IDs may be mapped via a weak reference to an API (e.g., API 240), which may then output this information to the GPU 210 for rendering and display. Processing data in this way is advantageous as it minimizes data repetition.

In some instances, the scene graph may be optimized by only including representative nodes for surfaces visible within the viewport, and not for nodes whose corresponding surfaces fall outside of the viewport or are non-visible (e.g., opacity zero, etc.). This allows the surface translation engine 236 to be more efficient by forgoing calculating the transform matrices for the non-visible objects. In addition, in some cases the scene translation engine 236 may only process nodes that have experience changes between a previous frame and a current frame. For instance, the scene translation engine 236 may compare a given node to its previous iteration to determine if there are any differences, and if not, will forgo processing that node and/or its children, etc. This can reduce processing cycles and improve efficiency when generating the scene graph. The matrix module 254 may format the scene graph into a format that is highly compatible with and directly usable by the rendering engine 230. For instance, the matrix module 254 may serialize the transform matrices in the scene graph, which may be output by the matrix module 254 and/or the scene translation engine 236 to the rendering engine 230 for application to existing visual objects, creating new objects, or deleting yet other objects. For instance, the rendering engine 230 may apply the scene graph to existing DOM elements, create the DOM elements if they don't exist yet (e.g., for new surfaces being created), and/or remove DOM elements corresponding to any objects that have been deleted.

The APIs 240 include software and/or logic for interfacing with and providing the functionality of the performance framework 116, and/or its constituent components to another software applications, such as the software application 260, the applications 114*a* . . . 114*n*, etc. In some implementations, the APIs 240 relays requests and responses from the other software application to the appropriate components of the performance framework 116 for processing. For example, in an implementation where the application 114 and the performance framework 116 reside on distinct computing devices coupled via the network 102, the application 114 may interface with the performance framework 116 via the APIs 240. The APIs 240 may be electronically communicatively coupled to the other components of the performance framework 116 to relay information. For example, in a multi-view implementation where the same physics context is shared via two or more rendered contexts on disparate computing devices, the APIs 240 can receive inputs via the network 102 and the network interface 208, from a remote instance of the performance framework 116, and provide the inputs to a local instance of the input engine 232 for processing and synchronization. The APIs 240 may also provide access to data stored on the computing device. In some implementations, the APIs 240 may require an interfacing software application to authenticate using a standard authentication protocol to utilize its functionality.

Additional structure, acts, and/or functionality of the one or more components of the client application 108, the software application 260, and/or the performance framework 116 including the rendering engine 230, the interaction engine 238, the input engine 232, the physics engine 234, the surface translation engine 236, and/or the APIs 240 are further discussed elsewhere herein.

Figure 3:
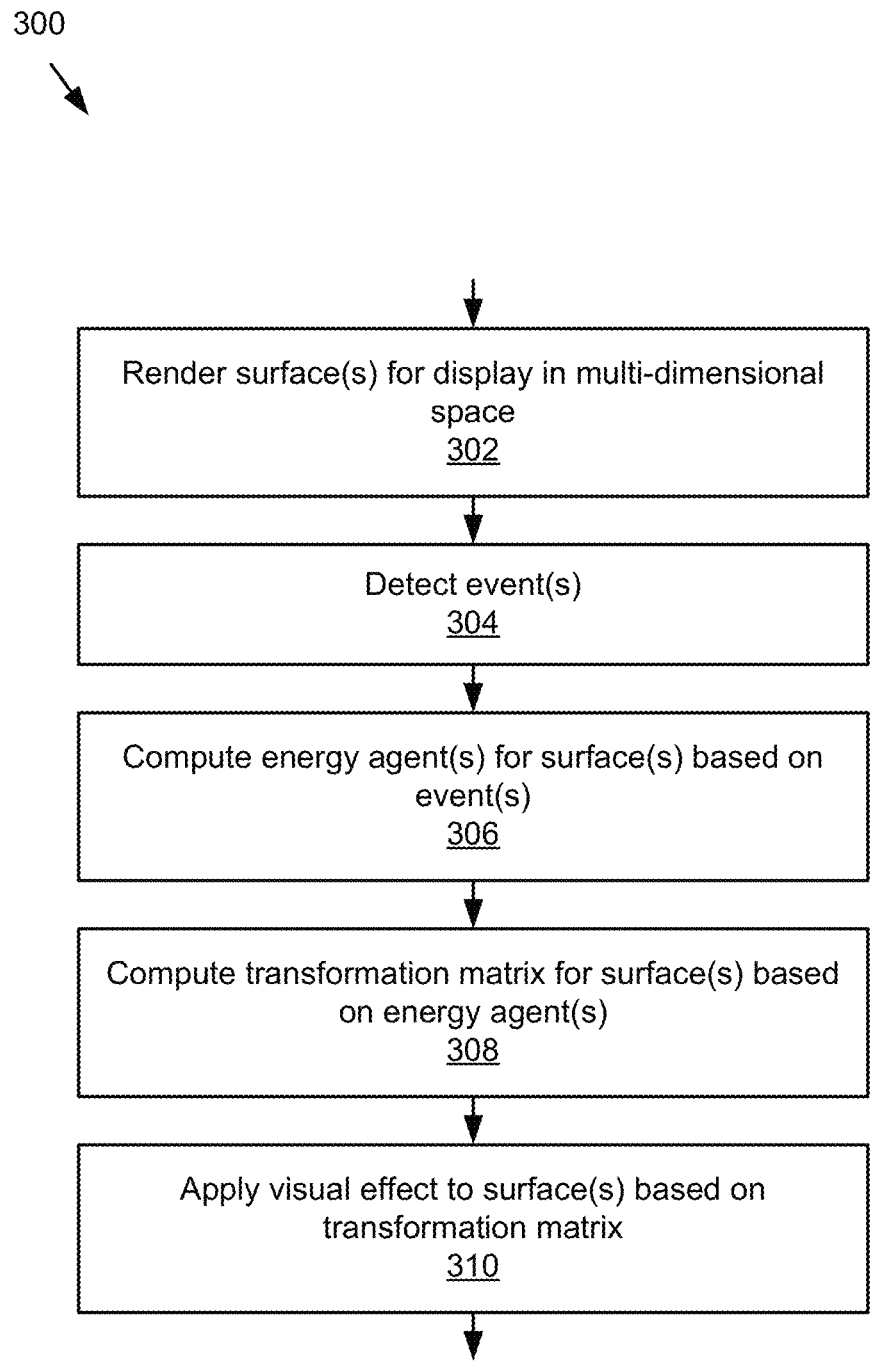
FIG. 3 is a flowchart of an example method for applying visual effects to one or more surfaces.

FIG. 3 is a flowchart of an example method 300 for applying visual effects to one or more surfaces based on a transformation matrix. The method 300 may begin by rendering 302 one or more surfaces for display in a multi-dimensional space (e.g., 3D space). For instance, the rendering engine 230 may render a context including one or more surfaces for display in three dimensions. The method 300 may detect 304 one or more events. The event(s) may reflect an action taken by the user relative to the rendered context (e.g., a touch input). The method 300 may compute 306 one or more energy agents for the one or more surfaces based on the one or more events detected in block 304. For example, the physics engine 234 may compute velocity and friction energy agents for the surface(s) associated with the context. The method 300 may proceed to compute 308 a transformation matrix for the one or more surfaces based on the one or more energy agents, and then apply 310 visual effects to the one or more surfaces based on the transformation matrix. For instance, the surface translation engine 236 may generate a scene graph that translates the one or more surfaces based on the effect(s) of the one or more energy agent(s), and the rendering engine 230 may, in cooperation with the GPU, apply a visual effect to the surface(s) using the scene graph.

Figure 4:
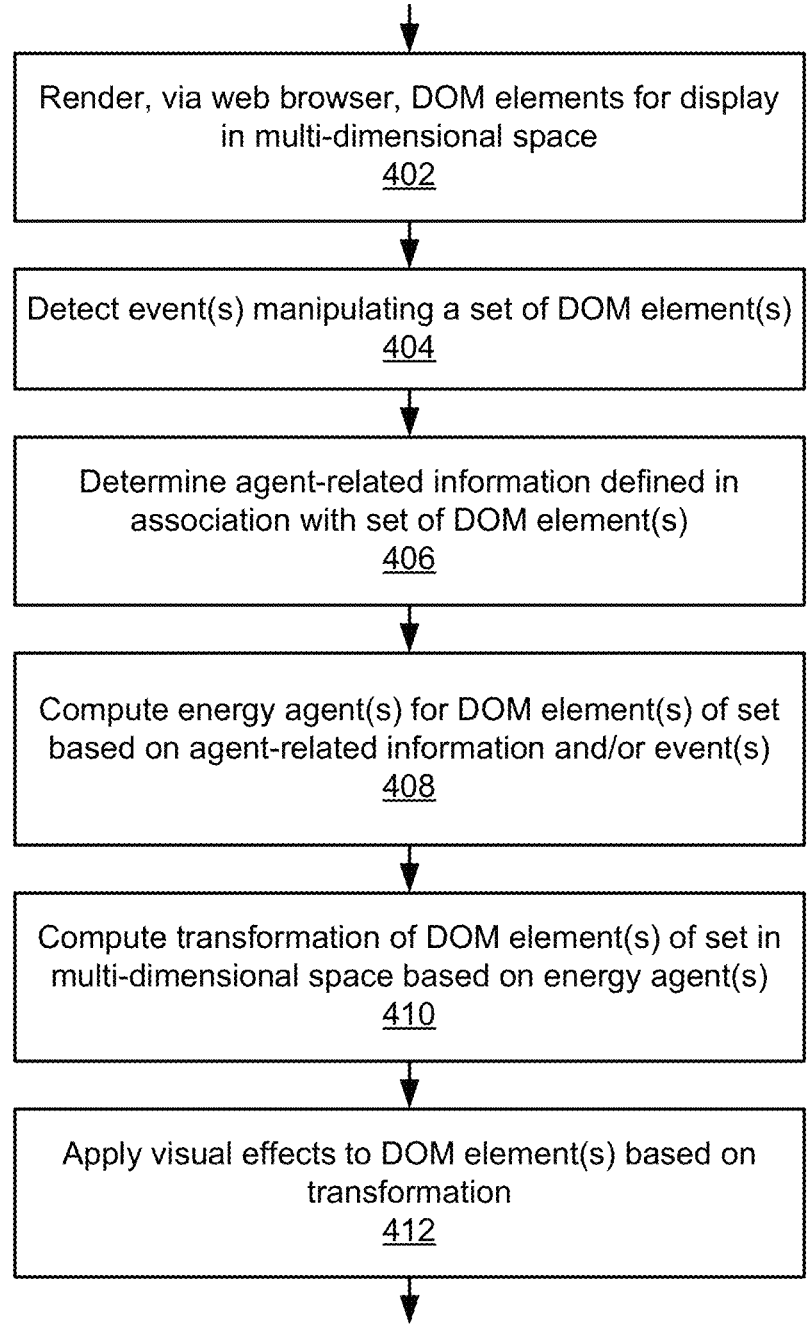
FIG. 4 is a flowchart of an example method for applying visual effects to one or more DOM elements.

FIG. 4 is a flowchart of an example method 400 for applying visual effects to one or more DOM elements based on a transformation computed using energy agents. The method 400 may begin by rendering 402, via a web browser, one or more DOM elements for display in a multi-dimensional space. For example, the rendering engine 230 may render the objects of a web page (e.g., container elements, images, text, etc.) in 3D space. As a further example, with reference to FIGS. 11A-11C, the rendering engine 230 may render a 3D user interface 1100 including one or more sets of tiles. The tiles may be organized in layers 1102, 1104, 1106, 1108, etc., that can be zoomed and/or panned through, and or selected using various input gestures. The tiles may include various content (e.g., text, video, images, audio, etc.) and may be interacted with by the user. For instance, the user interface 1100 may be web page associated with a news portal, a social network, a microblog, a blog, and/or messaging service (e.g., email), etc., and the tiles may include various posts, articles, messages, images, videos, etc., from those service(s).

Figure 11A:
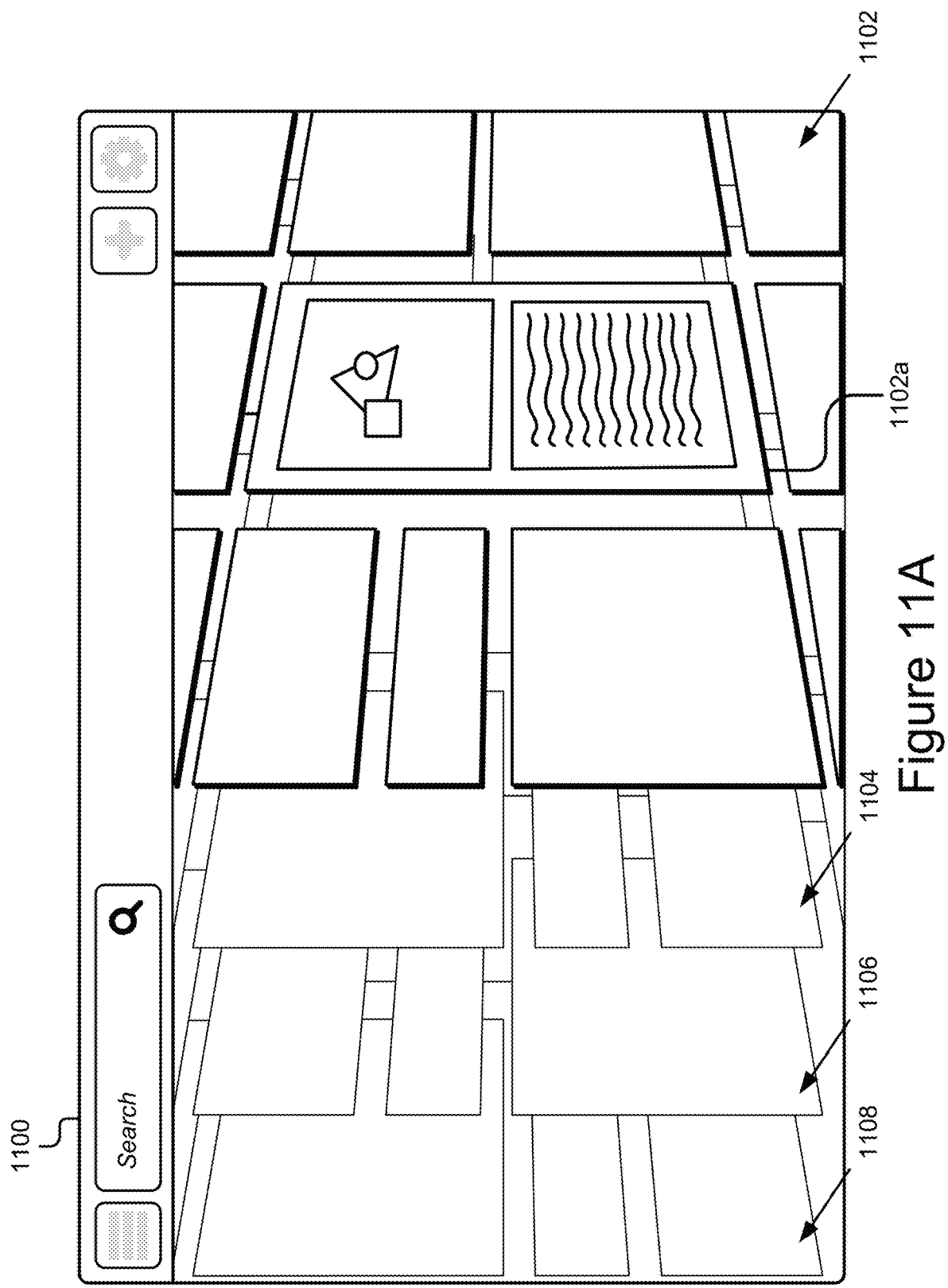
FIG. 11A-C are graphical representations of an example user interface for interacting with and viewing document fragments in 3D space.
Figure 11B:
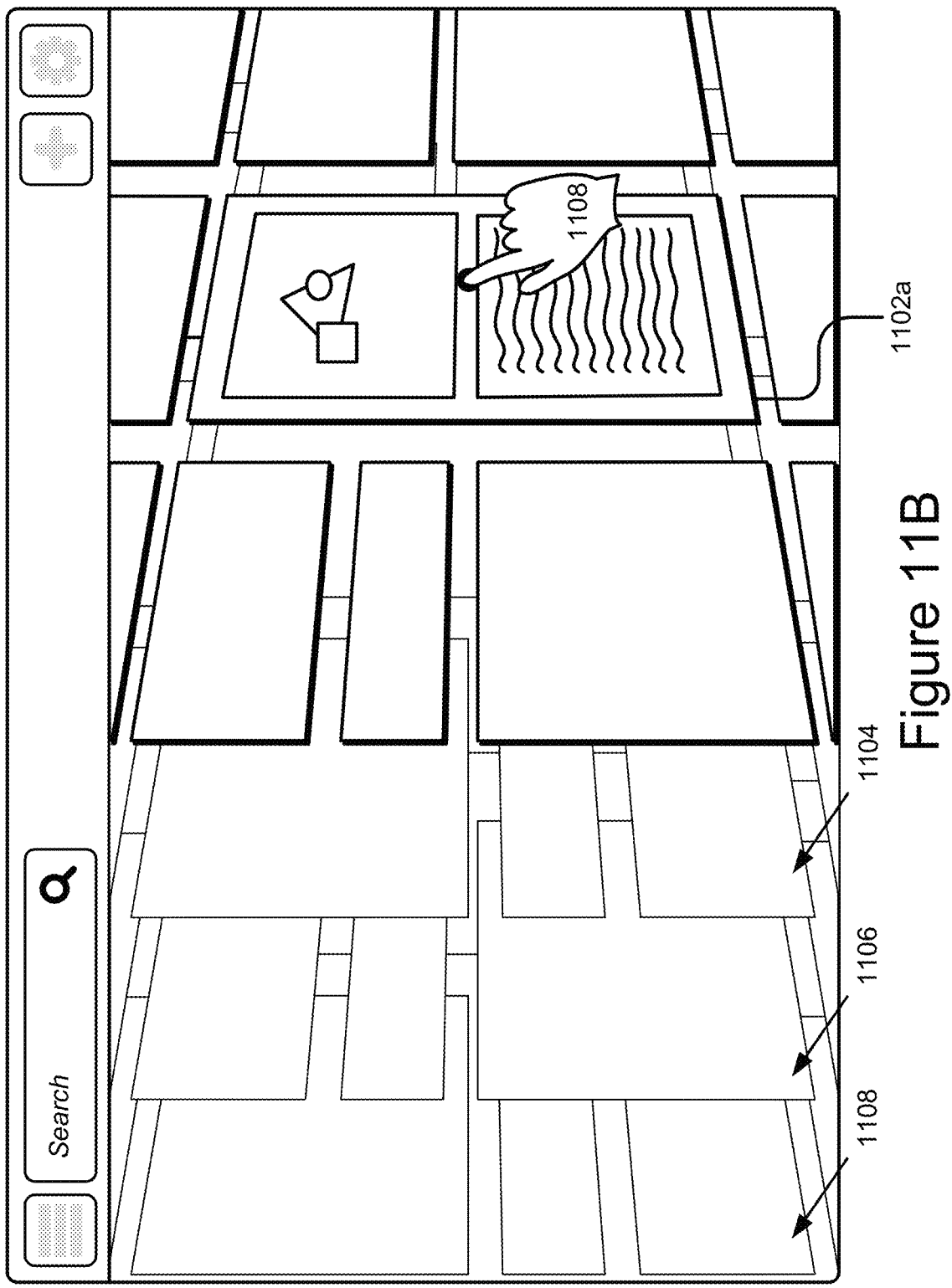

Referring again to FIG. 4, the method 400 may continue by detecting 404 one or more events manipulating a set of one or more DOM elements rendered for display in block 402. For example, as depicted in FIG. 11B, a user may select (e.g., using a tap gesture 1108) a tile 1102*a*. The method 400 may determine 406 agent-related information defined in association with the set of one or more DOM elements. In some instances, the agent-related information may be determined in response to receiving an event. For instance, the tile 1102*a*, the tiles 1102, and/or the window 1100, etc., may have one or more energy agents added that define the movement-related and/or appearance-related attributes of the tile 1102*a*, such as the attributes of the tap selection (e.g., the highlighting effect), the attributes of the zoom effect (e.g., the speed, movement, and/or friction, etc.) of the zoom, etc., and the application of the energy agents to the tile 1102 may be triggered by the event (e.g., a tap input).

Figure 11C:
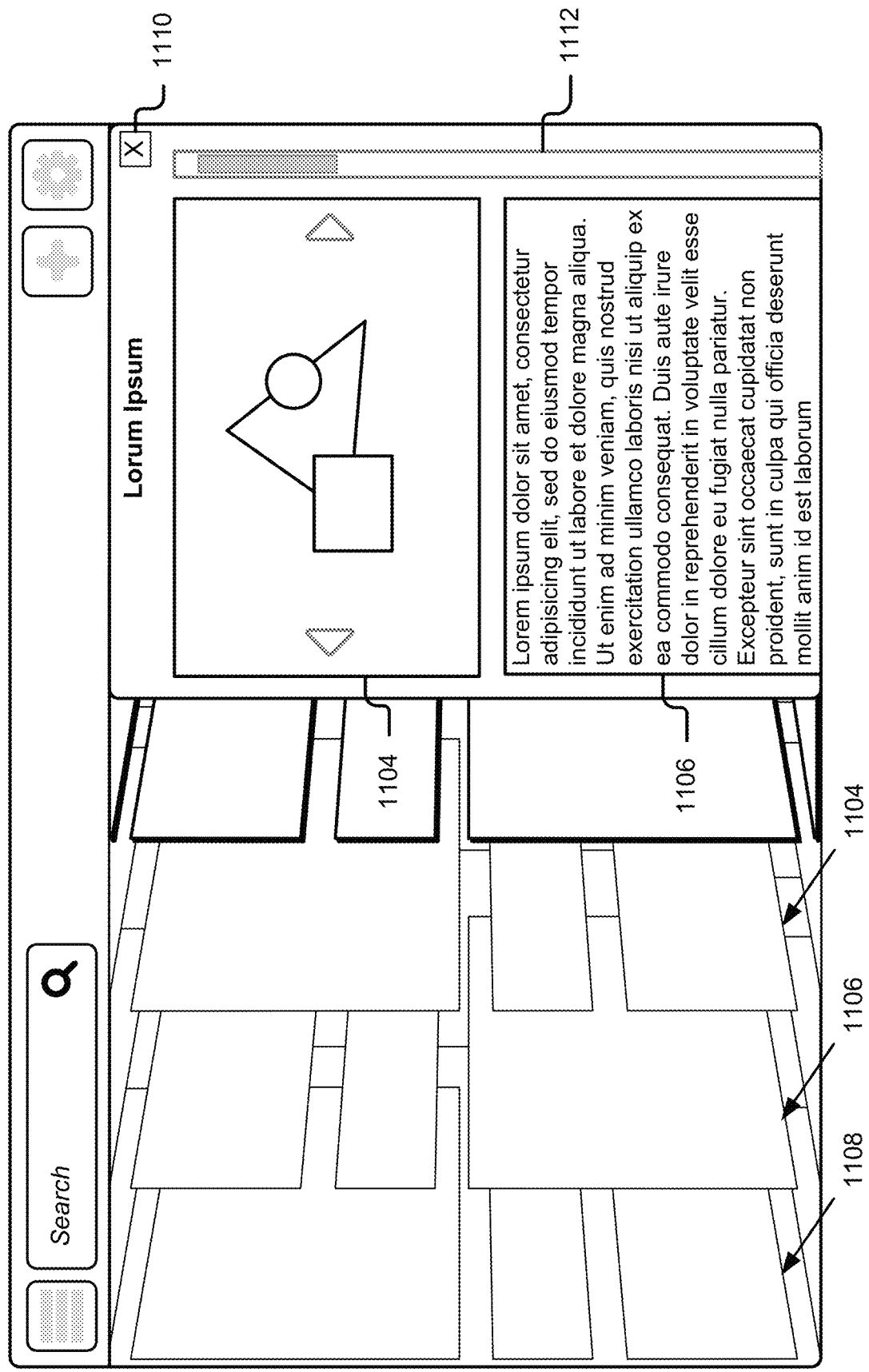

The method 400 may continue by computing 408 one or more energy agents for the one or more DOM elements of the set based on the agent-related information and/or the one or more events detected in block 404. For example, the physics engine 234 may compute the physical effects that the energy agent(s) and/or input(s) have on the one or more DOM elements. Next, the method 400 may compute 410 a transformation of the one or more DOM elements of the set in the multi-dimensional space based on the one or more energy agents, and may apply 412 visual effects to the one or more DOM elements based on the transformation. For instance, the tile 1102*a* may be zoomed by the rendering engine 230 based on one or more transformations applied to a corresponding node in a scene graph generated by the surface translation engine 236. For example, as shown in FIG. 11C, the tile may be snapped to two-dimensional, expanded position so the user can better view and interact with the content included in the tile 1102*a*, such as the image 1104 and the text 1106. The tile may also include a close button 1110 for closing the expanded view of the tile 1102*a* and returning to the interface 1100 as shown in FIG. 11A, as well as a scroll bar 1112 for scrolling up/down for more information associated with the content. In some instances, various energy agents may be defined in association with the tile 1102a that control the movement and/or visual appearance of the closure and scrolling of the tile 1102a.

Figure 5A:
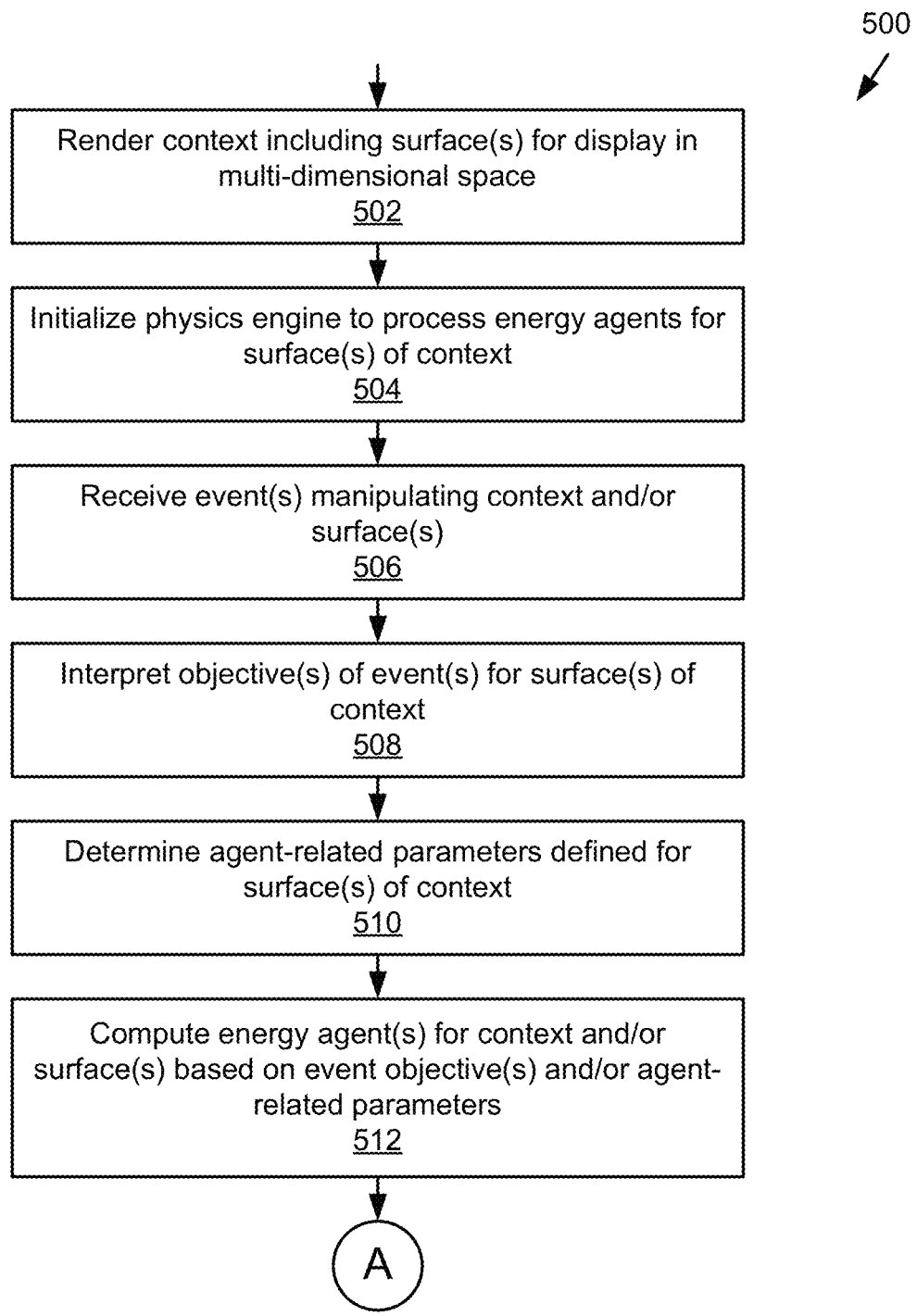
FIGS. 5A-B are flowcharts of an example method for agent computation and processing.
Figure 5B:
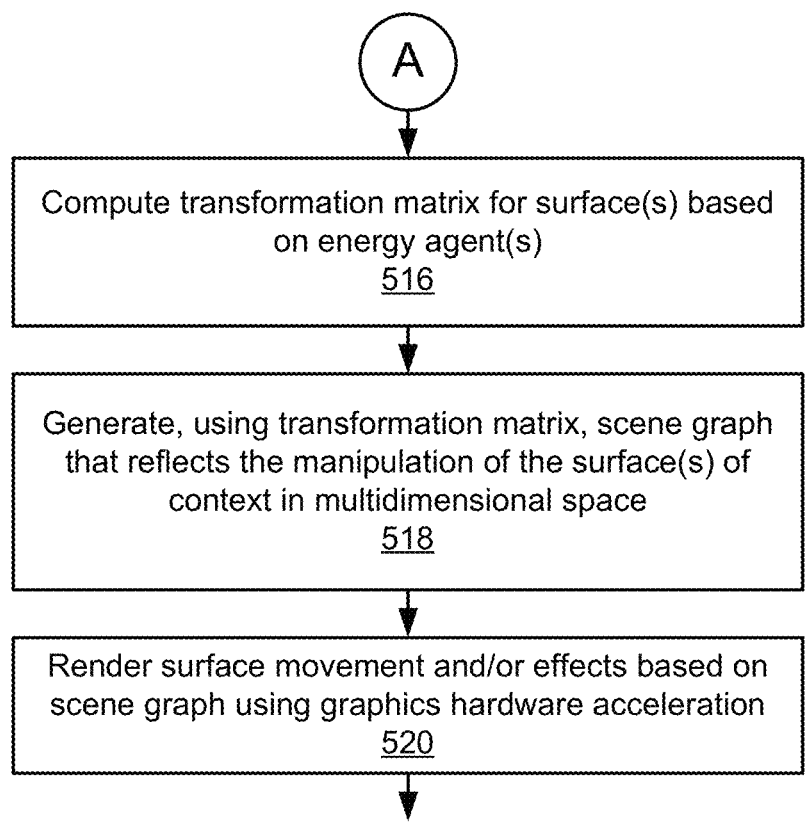

FIG. 5A-B is flowchart of an example method for agent computation and processing. The method 500 may begin by rendering 502 a context including one or more surfaces for display in a multi-dimensional space. The method 500 may initialize 504 one or more instances of a physics engine 234 to process energy agents for the one or more surfaces of the context. For instance, upon rendering the context for display, the rendering engine 230 may instantiate an instance of the physics engine 234 via the JavaScript Interpreter 282. The method 500 may proceed by receiving 506 one or more events manipulating the context and/or the one or more surfaces. The method 500 may interpret 508 one or more objectives of the one or more events for the one or more surfaces of the context. For example, the input engine 232 may handle and process the one or more events to determine their type, and or incorporate the events into one or more higher level events. The method 500 may determine 510 agent-related parameters defined for the one or more surfaces of the context. For instance, the parameters may include an agent type(s), agent attributes, such as variables that characterize their effect and/or level of influence, etc.

The method 500 may continue by computing 512 one or more energy agents for the context and/or the one or more surfaces based on the one or more event objectives and/or the agent-related parameters. The method 500 may then compute 516 a transformation matrix for the one or more surfaces based on the one or more energy agents. By way of example, the physics engine 234 may use the one or more events as inputs when computing the energy agent(s), and may determine the transformational state of the context and/or the one or more surfaces based on the energy agent(s). The physics engine 234 may output the transformation state as a matrix to the surface translation engine 236. The method 500 may generate 518, using at least in part the transformation matri(ces), a scene graph that reflects the manipulation of the context and/or the one or more surfaces in the multidimensional space. The method 500 may then render 520 surface movement and/or effects for the surfaces and/or context based on the scene graph using graphics hardware acceleration.

Figure 6:
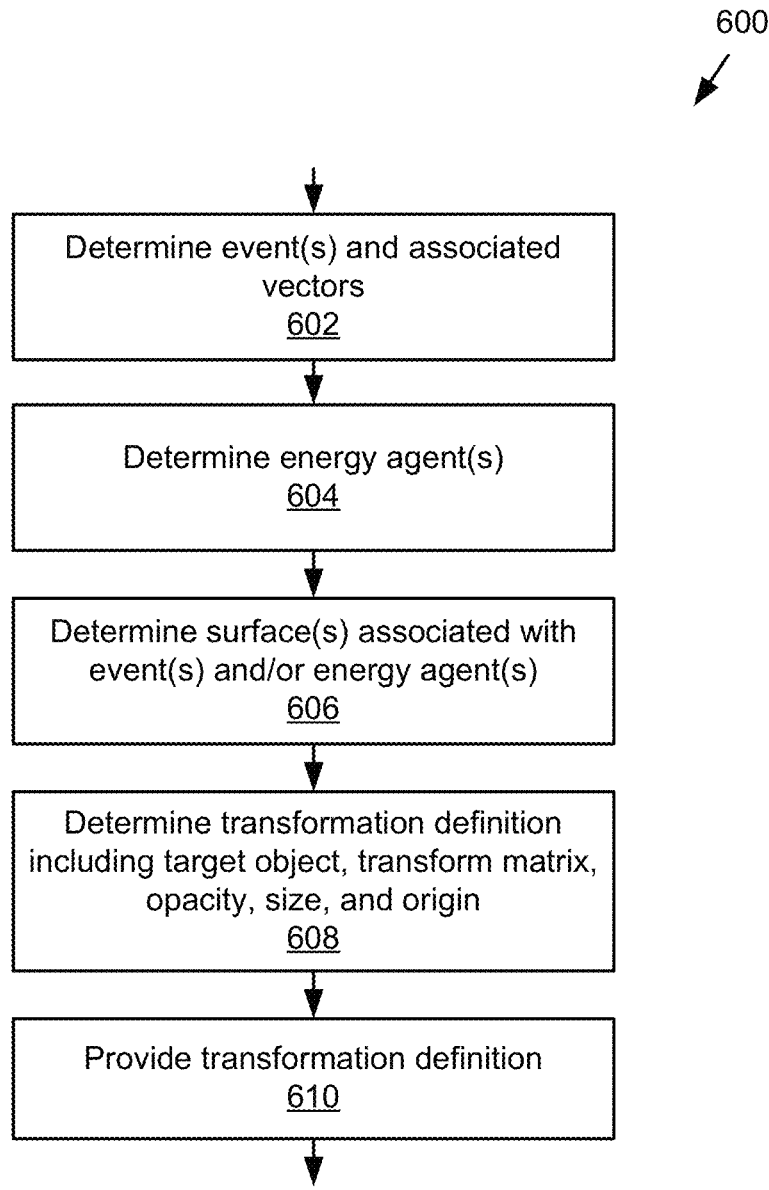
FIG. 6 is a flowchart of an example method for determining transformation data.

FIG. 6 is a flowchart of an example method 600 for determining transformation data. As depicted in method 600, the physics engine 234 may determine 602 one or more events and their associated vectors. For instance, the physics engine 234 may receive the events and associated vectors from the input engine 232. The physics engine 234 may determine one or more energy agent(s). For instance, the physics engine 234 may receive notification of one or more energy agent(s) from a rendered context and/or one or more surfaces associated therewith. The physics engine 234 may determine 606 the surface(s) associated the event(s) and/or energy agent(s). In some instances, the surfaces may be DOM elements, and the events and/or energy agents may be JavaScript objects associated with the surfaces, and the physics engine 234 may receive notification of the event(s) and/or energy agent(s) based on certain triggering criteria, such as the receipt of a particular event type. Next, the physics engine 234 may determine 608 a transformation definition including, for example, for each of the affected surfaces, a target object ID (e.g., surface), a transform matrix, opacity, a size, and/or an origin, and may provide the transformation definition to the surface translation engine 236 for use in generating a corresponding scene graph.

Figure 7:
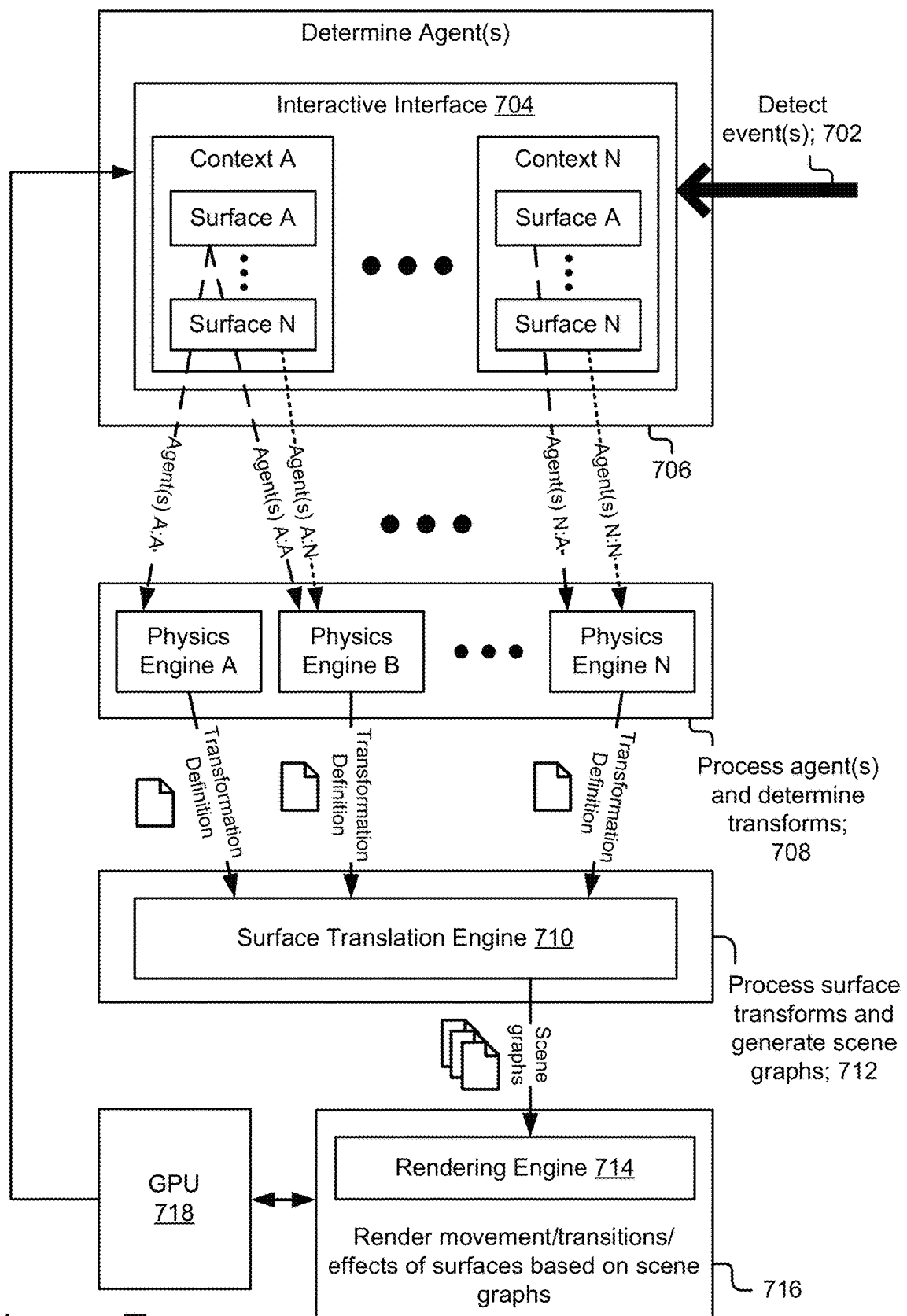
FIG. 7 is a block diagram illustrating an example method for efficiently manipulating surfaces in multi-dimensional space using energy agents.

FIG. 7 is a block diagram illustrating an example method 700 for efficiently manipulating surfaces in multi-dimensional space using energy agents. The method 700 may begin by the interactive interface 704 detecting 702 one or more events. As depicted, the interactive interface 704 may include one or more contexts A . . . N, each context including one or more surfaces A . . . N. A surface may, in some instances, also represent each context itself and be manipulated accordingly. In some implementations, the one or more events may be detected and received by the interaction engine 238.

The method 700 may determine 706 one or more agents A:A . . . N:N applicable to various surface(s) of the context(s) A . . . N, and pipe them to one or more instances A . . . N of the physics engine 234. For example, in context A, surface A may pipe energy agent(s) A:A to instances A and B of the physics engine, and surface N may pipe energy agent(s) A:N to instance B of the physics engine. In context N, surface A may pipe agent(s) N:A to instance N of the physics engine, and surface N may pipe agent(s) to instance N of the physics engine. The contexts and/or surfaces may also pipe the detected events to an input engine (not shown) for processing, as discussed elsewhere herein. The processed events may then be sent to the corresponding physics engine instances A . . . N for use as inputs when processing the energy agents. The physics engine instances A . . . N may process 708 the one or more agents A:A . . . N:N to determine one or more transformation definitions.

The physics engine instances A . . . N may then send the corresponding transformation definitions to the surface translation engine 710, which processes 712 the definitions to generate scene graphs. The scene graphs can then be sent to a rendering engine 714, which renders 716 movement/transitions/effects of surfaces in cooperation with the GPU via the interactive interface 704. In some cases, the process depicted by FIG. 7 may be executed in (near) real-time (e.g., in reaction to detecting the events) so as to provide the user with a responsive and interactive onscreen experience. The method 700 may be reiterated as new events are detected, and so on and so forth. The components discussed with reference to the method 700, such as the physics engine instances A . . . N, the surface translation engine 710, the rendering engine 714, and/or the GPU 718, etc., may, in some implementations, be the same or substantially the same, or share the same or substantially the same characteristics, with corresponding components, such as the physics engine instances 234, the surface translation engine 236, the rendering engine 230, the GPU 210, etc., discussed elsewhere herein.

Figure 8A:
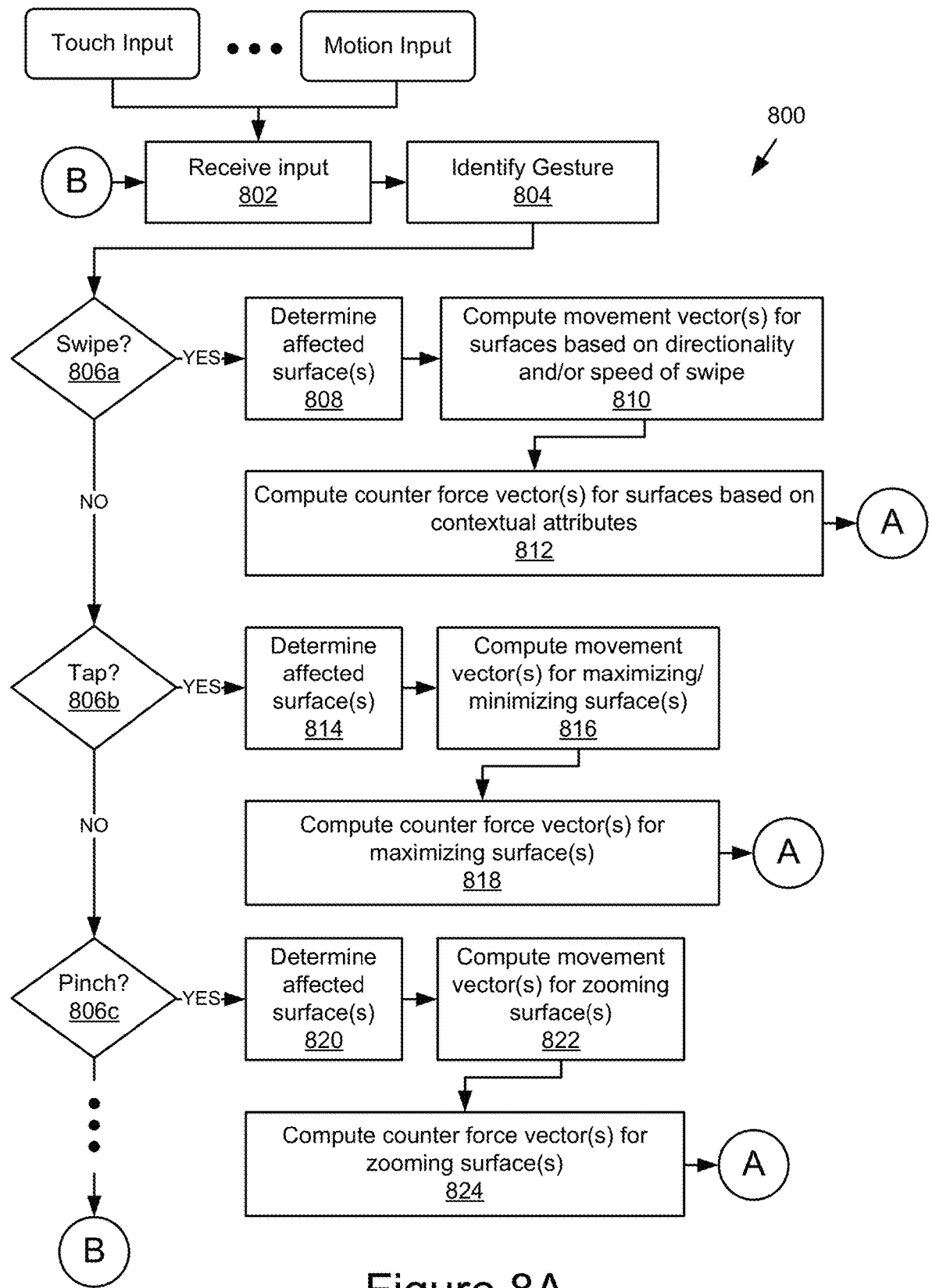
FIG. 8A-B are flowcharts of an example method for computing energy vectors based on touch and motion inputs.
Figure 8B:
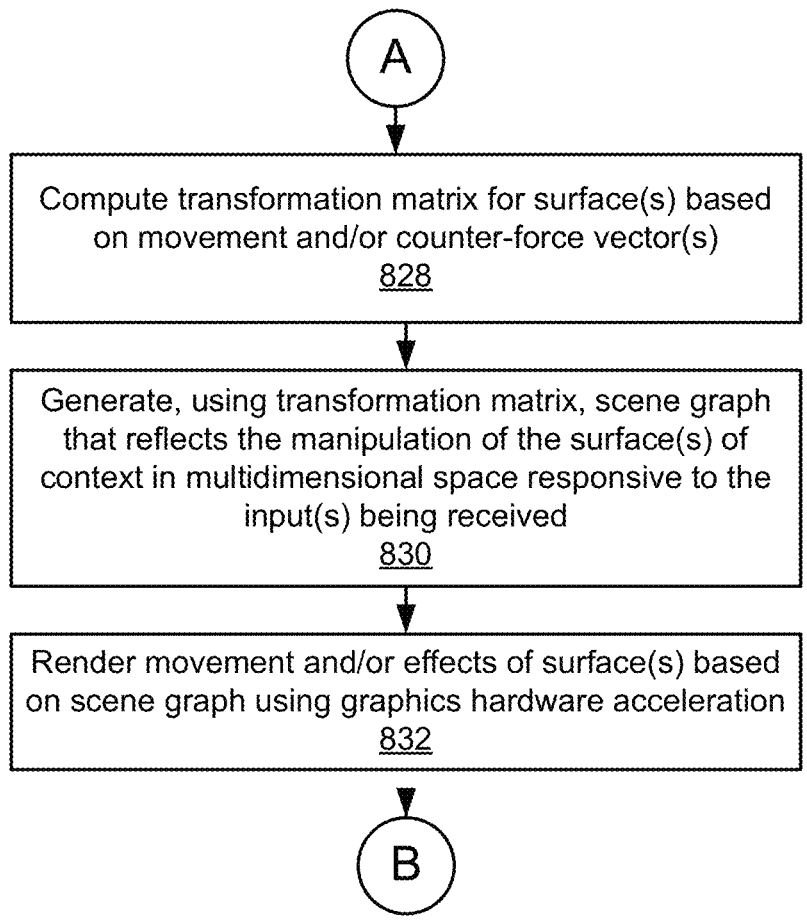

FIGS. 8A-B are flowcharts of an example method 800 for computing energy vectors based on touch and motion inputs. The method 800 may begin by receiving 802 an input including, for example, a touch input, a motion (e.g., open-air) input, etc. The method 800 may identify 804 a gesture associated with the input and then determine, based on the gesture type, how to process the input in blocks 806a, 806b, 806c, etc. It should be understood that the gesture types depicted in FIGS. 8A-B are provided as non-limiting examples, and that numerous other types of gestures are also contemplated and applicable.

In block 806a, if the method 800 determines that the gesture is a swipe gesture, then the method 800 may determine 808 which surfaces are affected by the gesture and then compute 810 one or more movement vectors (e.g., velocity) for the one or more surfaces based on directionality and/or speed of the swipe gesture. The method 800 may compute 812 one or more counter-force vectors (e.g., drag, friction, etc.) for the one or more surfaces based on contextual attributes.

In block 806*b*, if the method 800 determines that the gesture is a tap gesture, then the method 800 may determine 814 which surfaces are affected by the gesture. The method 800 may then compute 816 one or more movement vectors for maximizing or minimizing the one or more surfaces and one or more counter force vectors (e.g., an anchor) for opposing the maximization or minimization of the one or more surfaces.

In block 806*c*, if the method 800 determines that the gesture is a pinch gesture, then the method 800 may determine 820 which surfaces are affected by the gesture. The method 800 may then compute 822 one or more movement vectors for zooming the one or more surfaces and 824 one or more counter force vectors (e.g., damping, springing etc.) for opposing the zooming of the one or more surfaces.

Upon computing the one or more counter force vectors in blocks 812, 818, and 824, respectively, the method 800 may compute 828 transformation matri(ces) for the one or more surfaces based on movement and/or the one or more counterforce vectors. In some implementations, the blocks 802-828 may be process by the input engine 232 in cooperation with the physics engine 234.

Next, the method 800 may generate 830, using the transformation matri(ces), a scene graph that reflects the manipulation of the one or more surfaces of context in a multi-dimensional space (e.g., 3D space) responsive to the one or more input being received. The method 800 may continue by rendering 832 the movement and/or effects of the one or more surfaces based on the scene graph using graphics hardware acceleration. The method 800 may then return to block 802 to receive and process next input.

Figure 9:
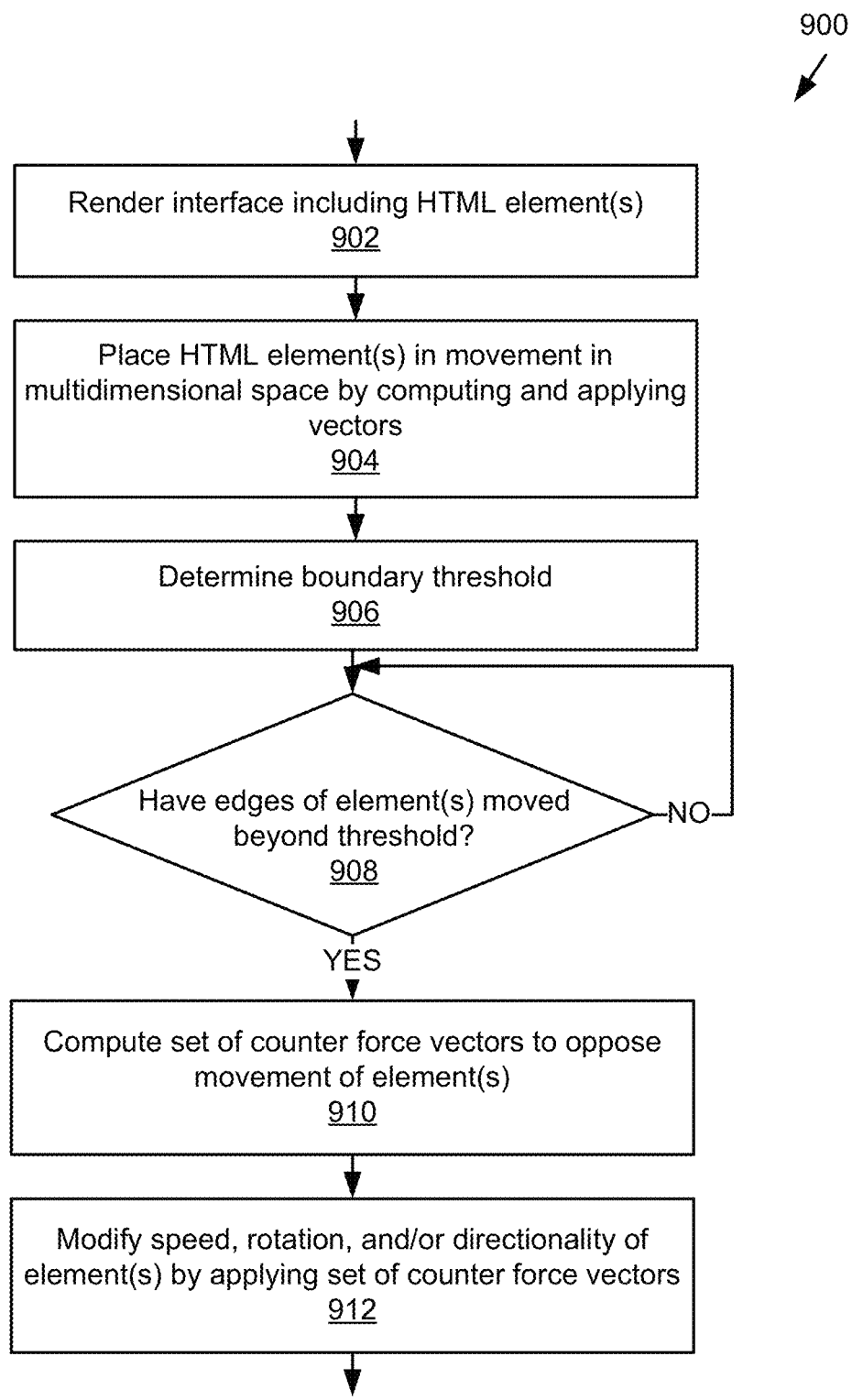
FIG. 9 is a flowchart of an example method for generating a visual boundary effect when a boundary of an interface frame has been exceeded.

FIG. 9 is a flowchart of an example method 900 for generating a visual boundary effect when a boundary of an interface frame has been exceeded. The method 900 may begin by rendering 902 an interface including one or more HTML elements. The rendering, in some instances may be performed by the rendering engine 230. When rendering, the method 900 may place 904 the one or more HTML elements in movement in a multi-dimensional space (e.g., 3D space) by computing and applying vectors to the elements. In some instances, the vectors may be computed and applied by the physics 232 engine and surface translation engine 236, in cooperation with the rendering engine 230 and the GPU 210.

The method 900 may continue by determining 906 a boundary threshold and may monitor whether one or more edges of the one or more elements have moved beyond the boundary threshold. If not, then the method 900 may effectively wait until one or more edges have exceeded the threshold. If so, then the method 900 may compute 910 a set of counter force vectors to oppose movement of the one or more elements and then modify 912 the speed, rotation, and/or directionality of the one or more elements by applying the set of counter force vectors. This can advantageously provide a bounce-back effect that is pleasing and natural to the user, while retaining the objects within the boundary threshold.

Figure 10:
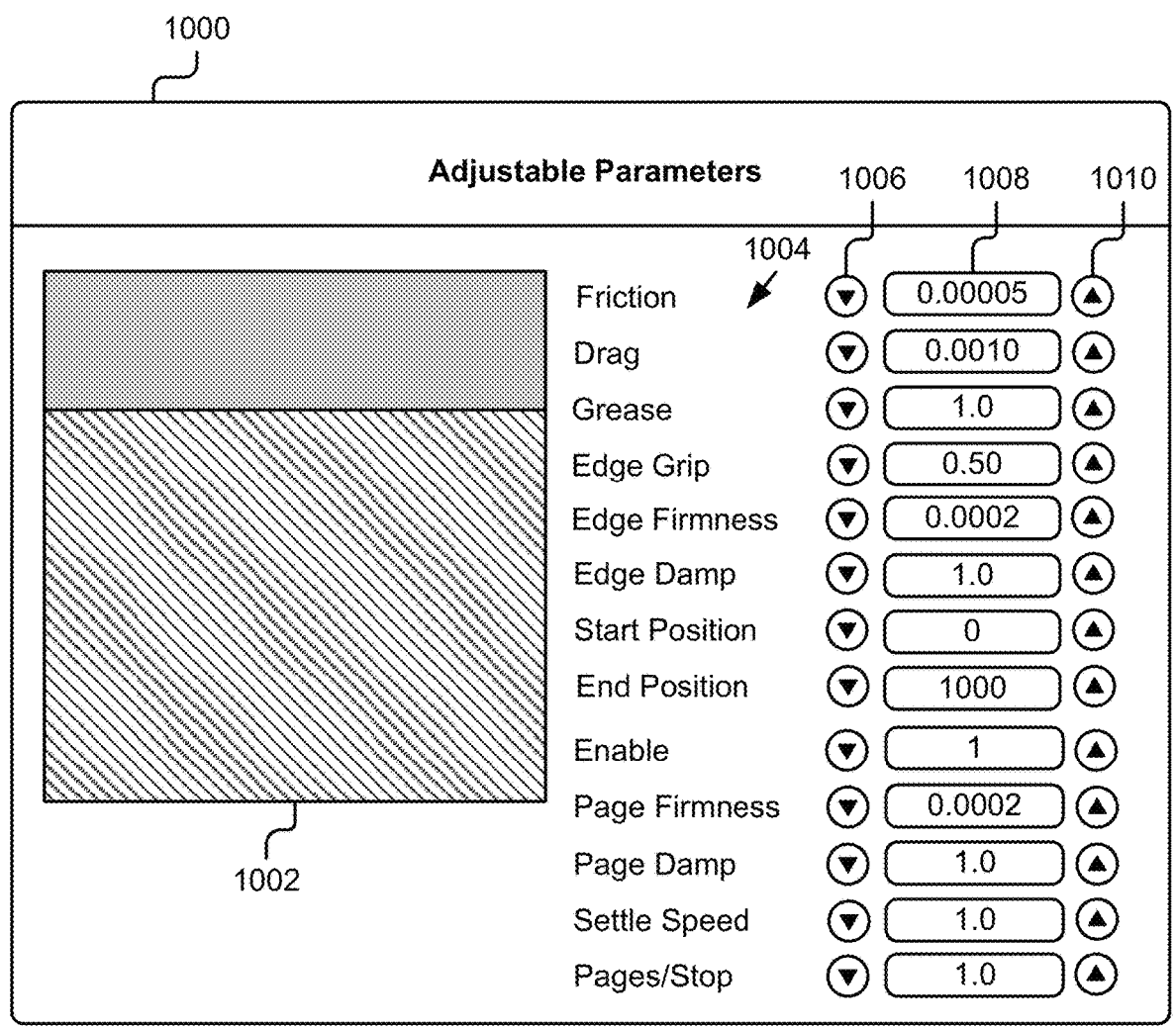
FIG. 10 is a graphical representation of an example user interface for setting parameters related to one or more energy agents.

FIG. 10 is a user interface depicting a set of adjustable parameters for the energy agents that can be applied to a renderable context and/or its surfaces. The user interface 1000 may include a preview window 1002 that illustrates the effects to an example context/surface of the adjustments being made to the parameters. The user interface 1000 includes a list of energy agent parameters 1004, which correspond to energy agents, such as friction, drag, grease, edge, boundary, page, settling, stopping, etc. The user interface 1000 includes decrease buttons 1006 for incrementally decreasing/lowering value of the corresponding parameters, display boxes 1008 for displaying the current values of the parameters, and increase buttons 1010 for incrementally increasing the values of parameters. Once set, these values may be associated by the performance framework 116 with the context and/or surfaces to which they are intended to apply.

Figure 12A:
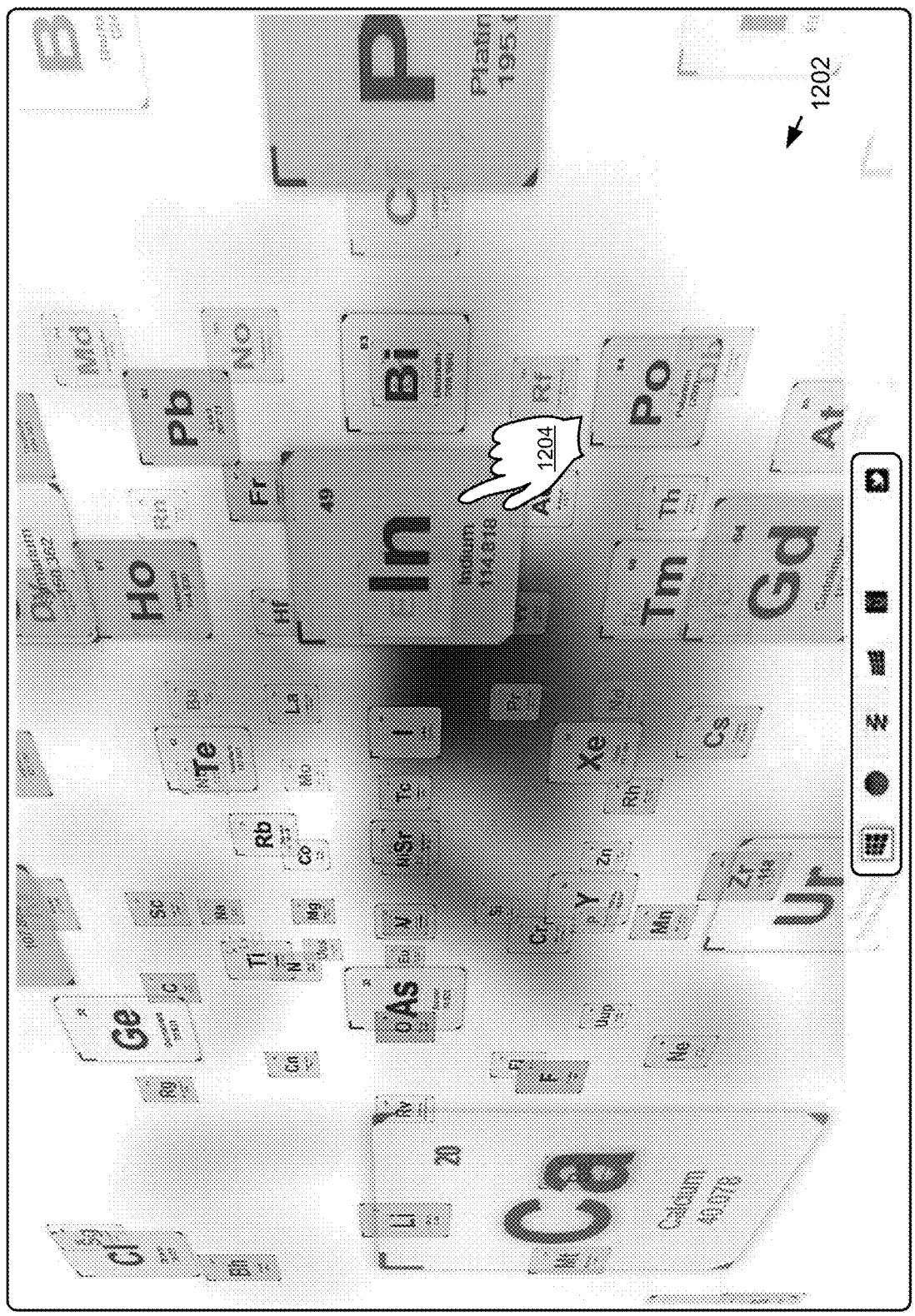
FIG. 12A-16C are graphical representations of user interfaces illustrating the manipulation of one or more surfaces in 3D space using energy agents.
Figure 12B:
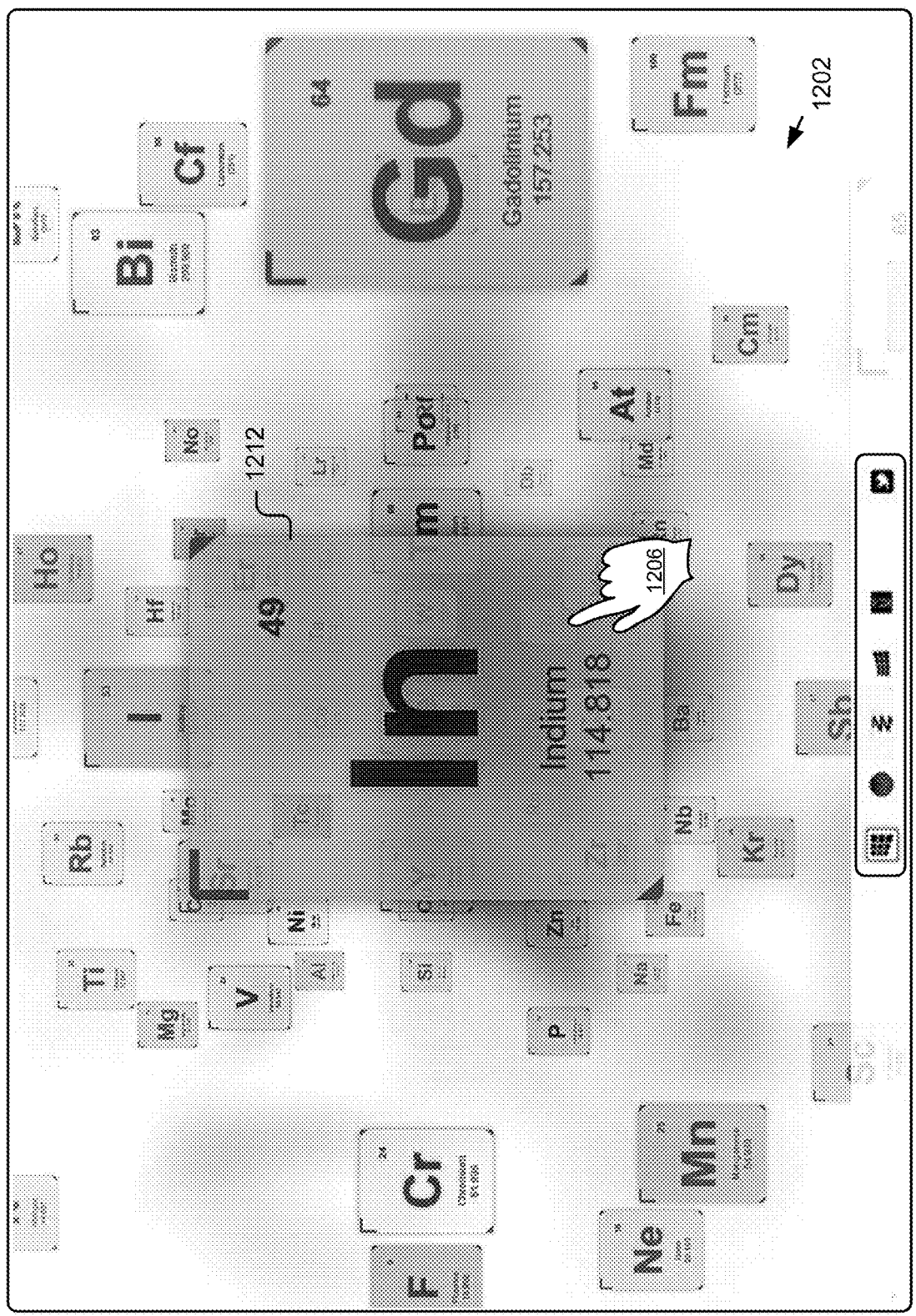
Figure 12C:
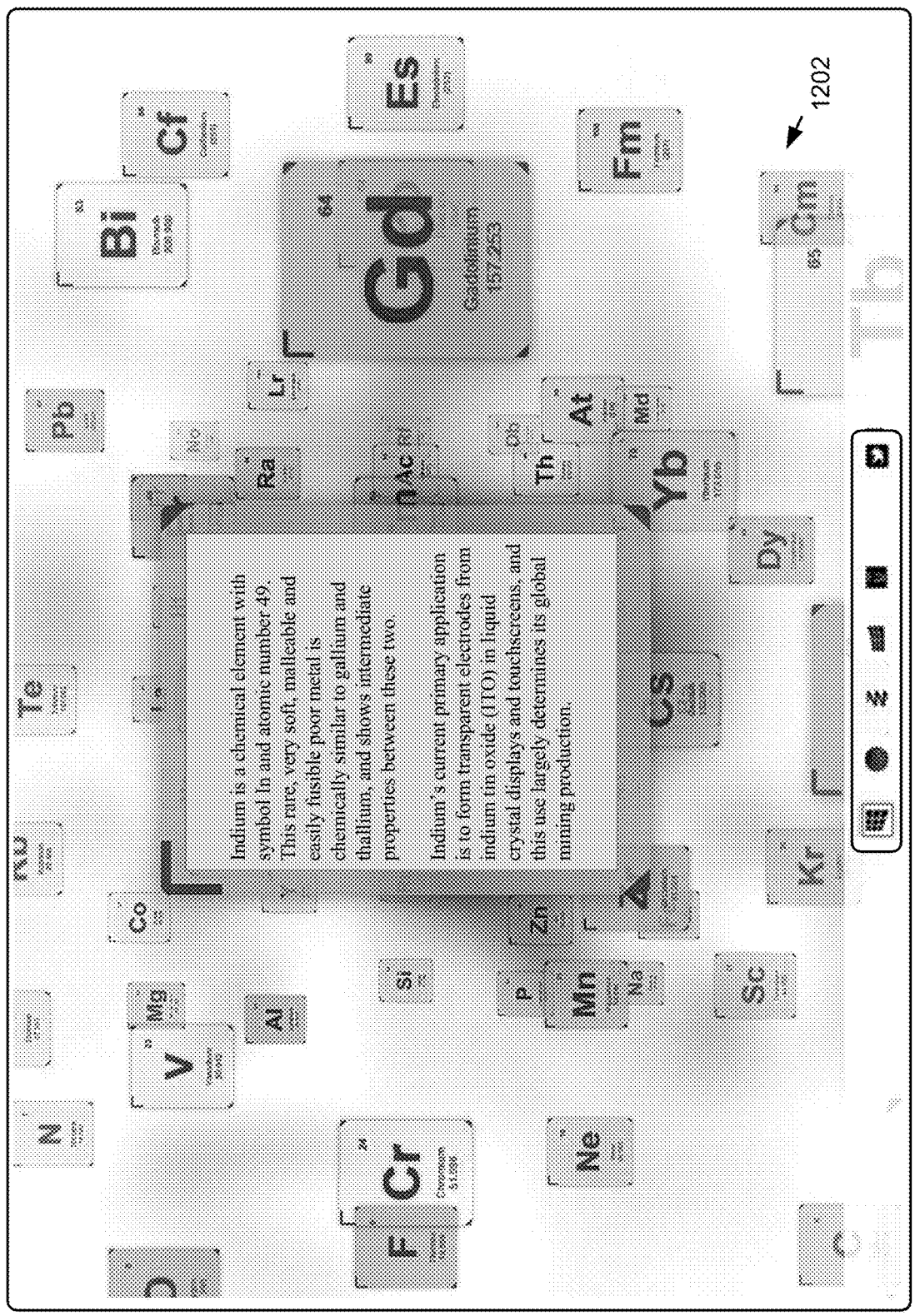

FIG. 12A-16C are graphic representations of user interfaces illustrating the manipulation of one or more surfaces in 3D space using energy agents. In particular, FIG. 12A shows a set of surfaces 1202 aligned along a vertical axis and rotationally offset relative to a front view. The set of surfaces 1202 can be rotated using a rotate gesture 1204 to a front view as shown in FIG. 12B, in which all the surfaces directly facing the user. The surfaces can be rotated using by applying at least a rotational energy agent to the set of surfaces 1202, as discussed elsewhere herein. An arbitrary surface (e.g., the Indium tile) can be selected using a tap gesture 1206, and in response a rotational energy agent can be applied to the surface to flip it over, as shown in FIG. 12C. In this example, flipping over the surface allows the user to read about Indium. In some cases, the flipping over of the surface may be synchronized with switching the visibility of the HTML elements corresponding to the title and description to give the appearance that the description was located on the back-side of the tile and the title on the front.

Figure 13A:
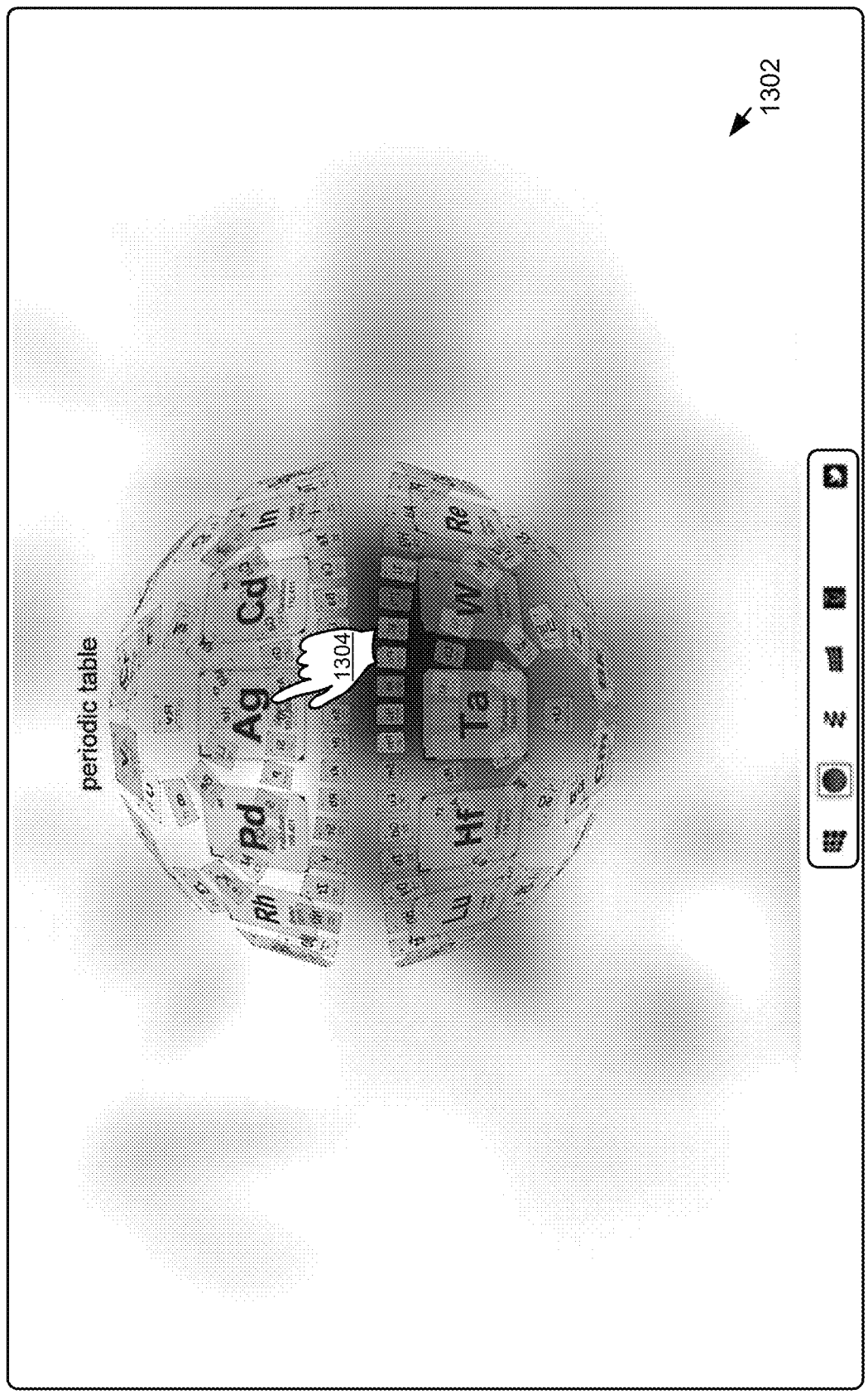
Figure 13B:
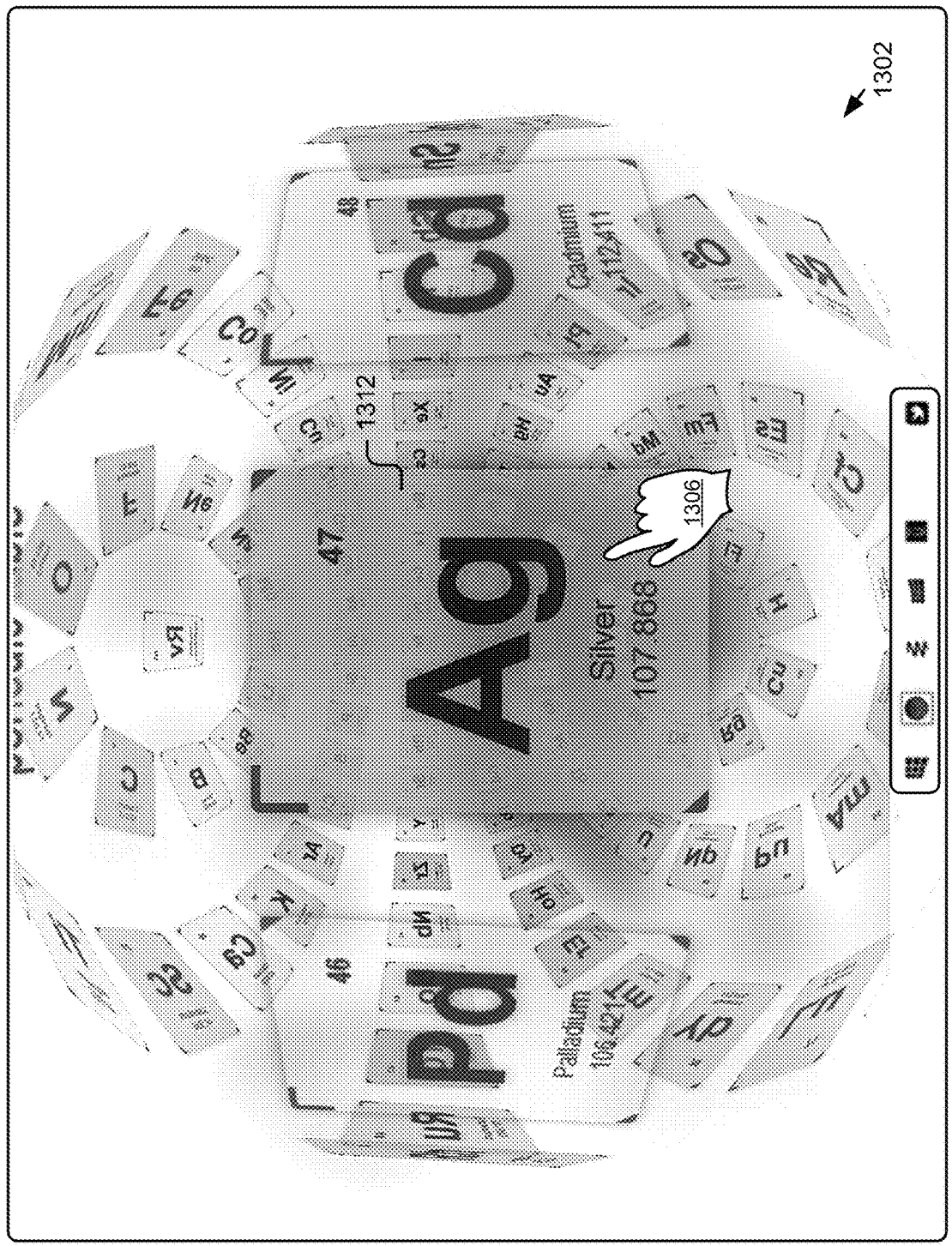
Figure 13C:
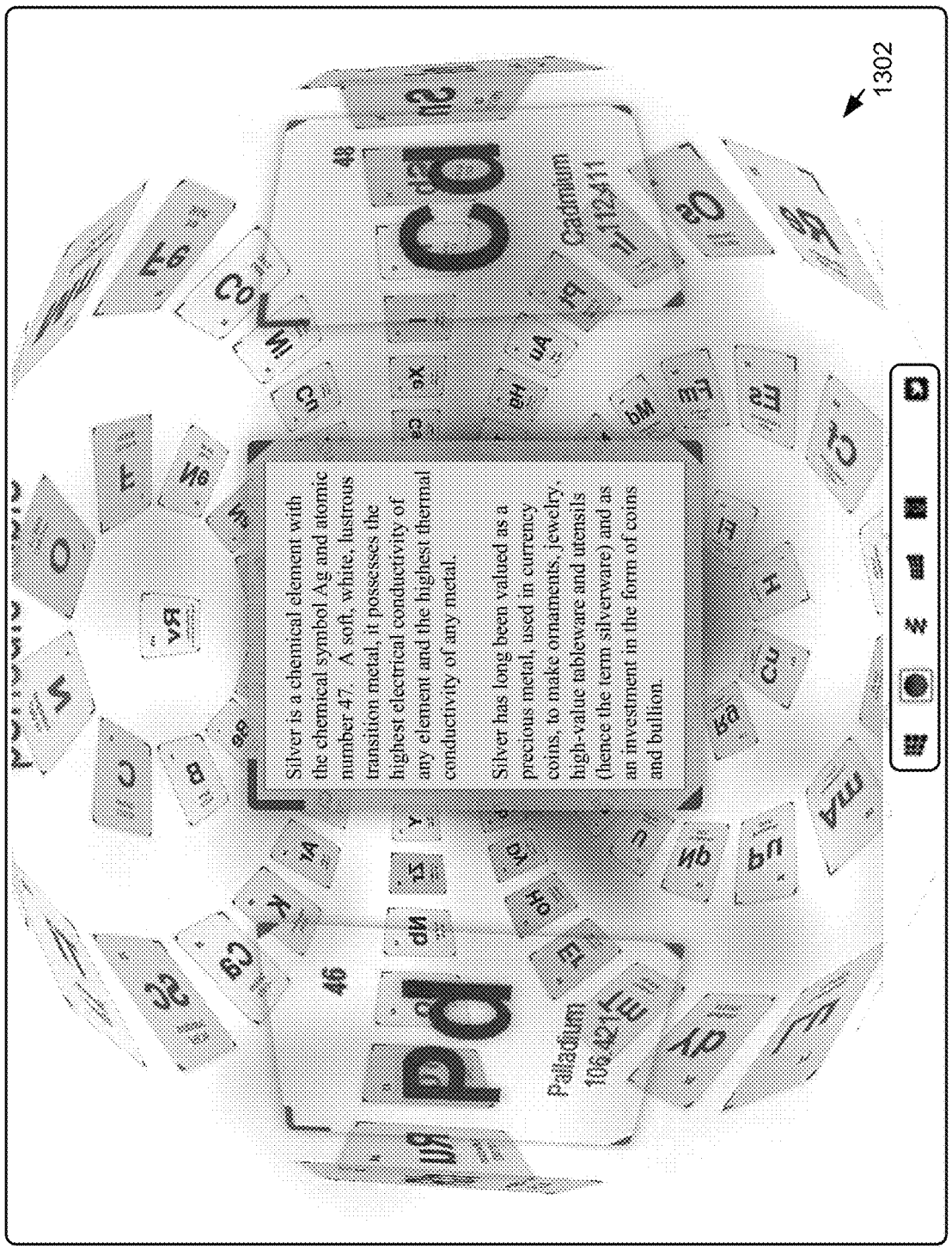

FIG. 13A shows a set of surfaces 1302 arranged in a spherical pattern. The set of surfaces 1302 can be zoomed using a zoom gesture 1304 to an expanded view as shown in FIG. 13B. Surfaces so displayed in the expanded view can be moved and/or rotated using at least a velocity and/or a rotational energy agent into a desired orientation. An arbitrary surface (e.g., the Silver tile) may be selected using a tap gesture 1306, and in response a rotational energy agent can be applied to the surface to flip it over as shown in FIG. 13C. In this example, flipping over the surface allows the user to read about Silver element.

Figure 14A:
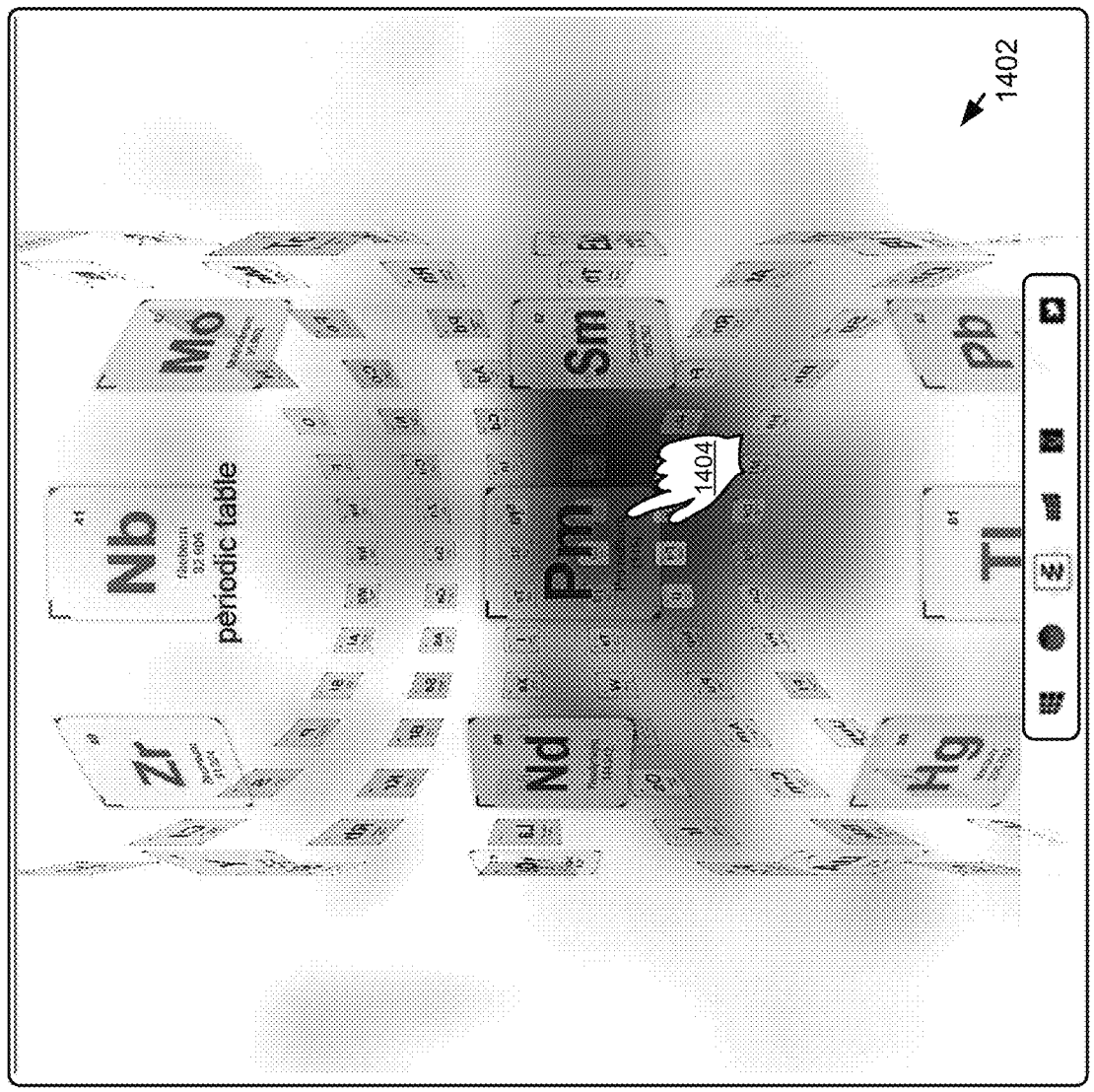
Figure 14B:
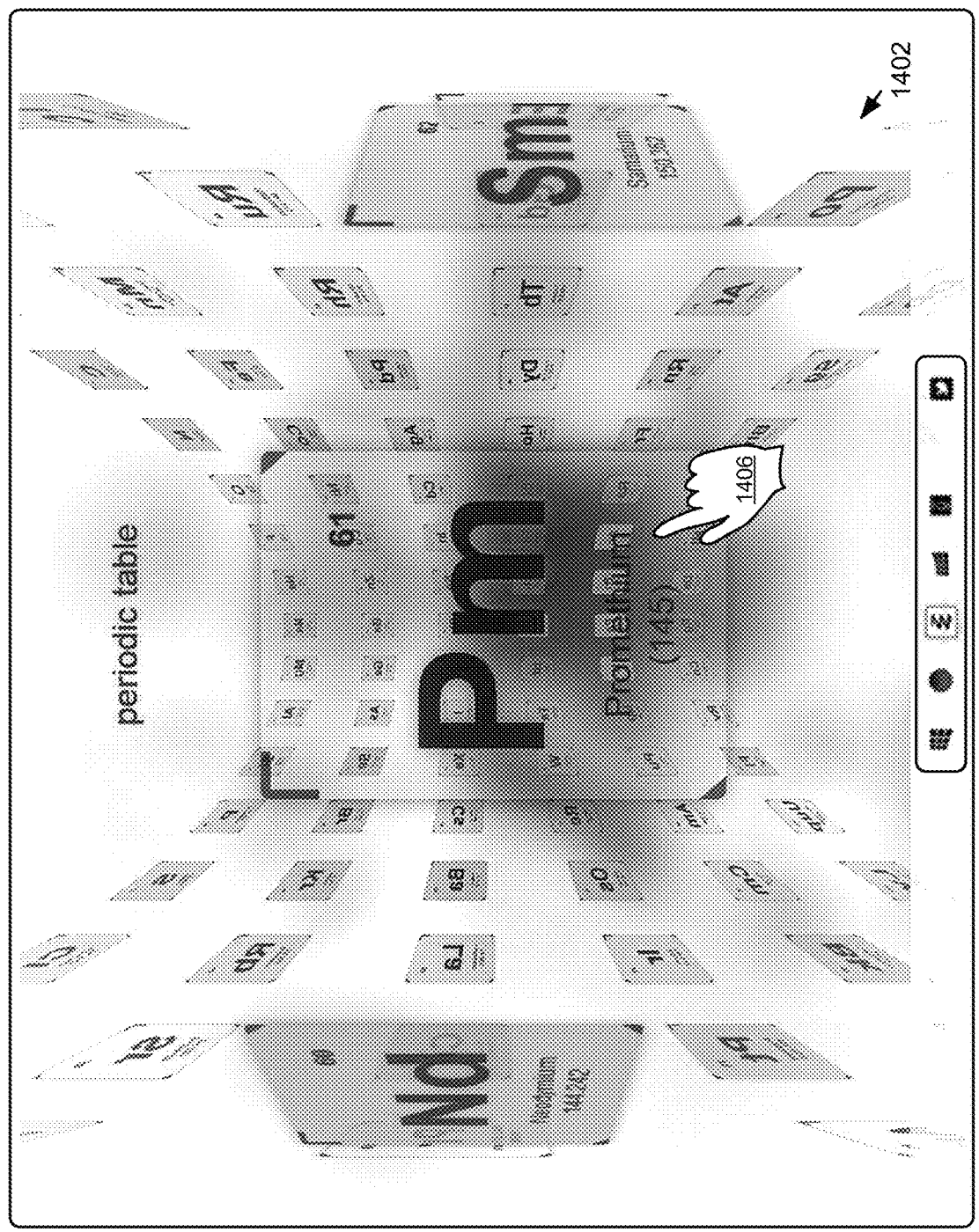
Figure 14C:
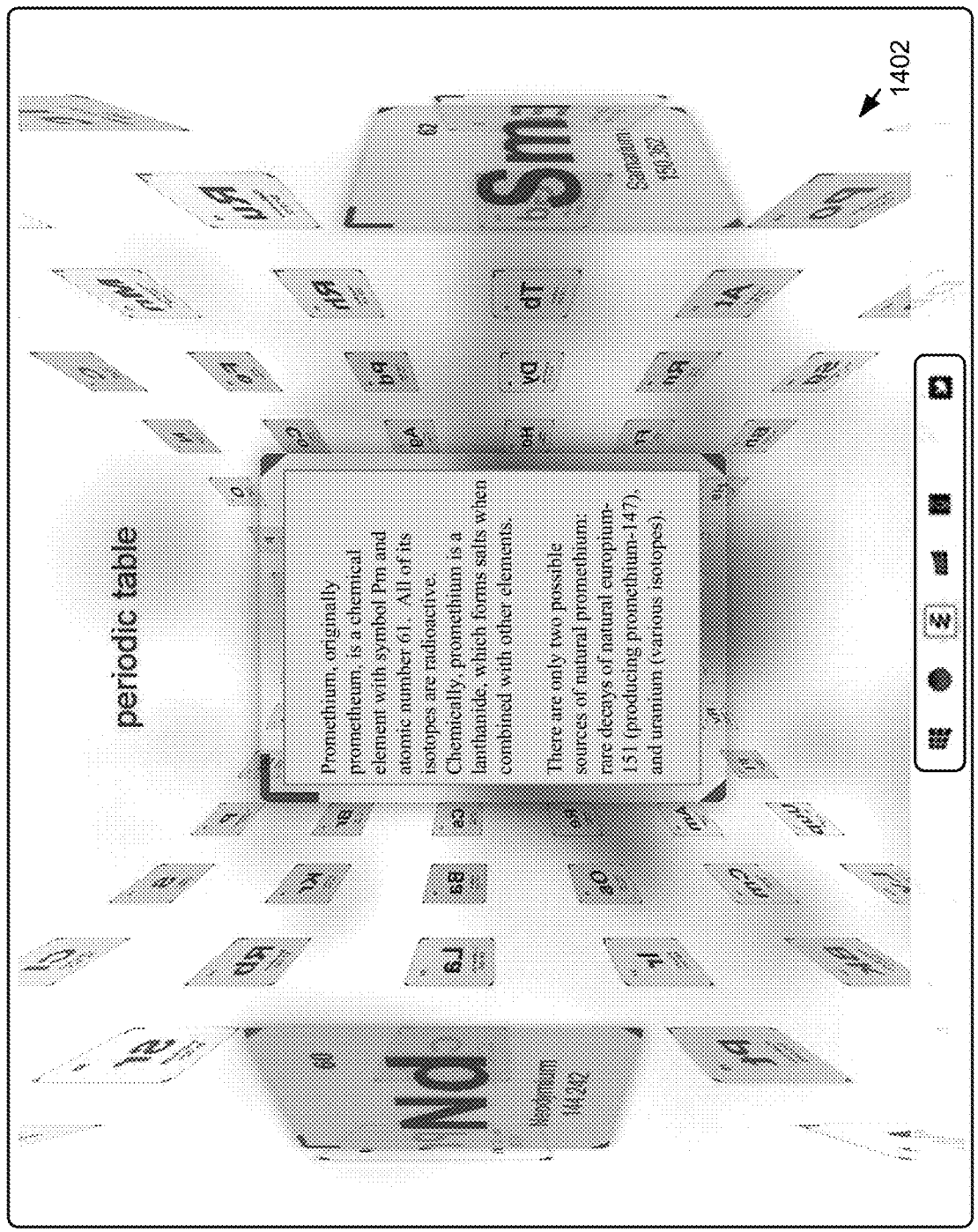

FIG. 14A shows a set of surfaces 1402 arranged in a helical pattern. The set of surfaces 1402 can be zoomed using a zoom gesture 1404 to an expanded view as shown in FIG. 14B. Surfaces so displayed in the expanded view can be moved and/or rotated using at least a velocity and/or a rotational energy agent into a desired orientation. An arbitrary surface (e.g., the Promethium tile) can be selected using a tap gesture 1406, and in response a rotational energy agent can be applied to the surface to flip it over as shown in FIG. 14C. In this example, flipping over the surface allows the user to read about Promethium element.

Figure 15A:
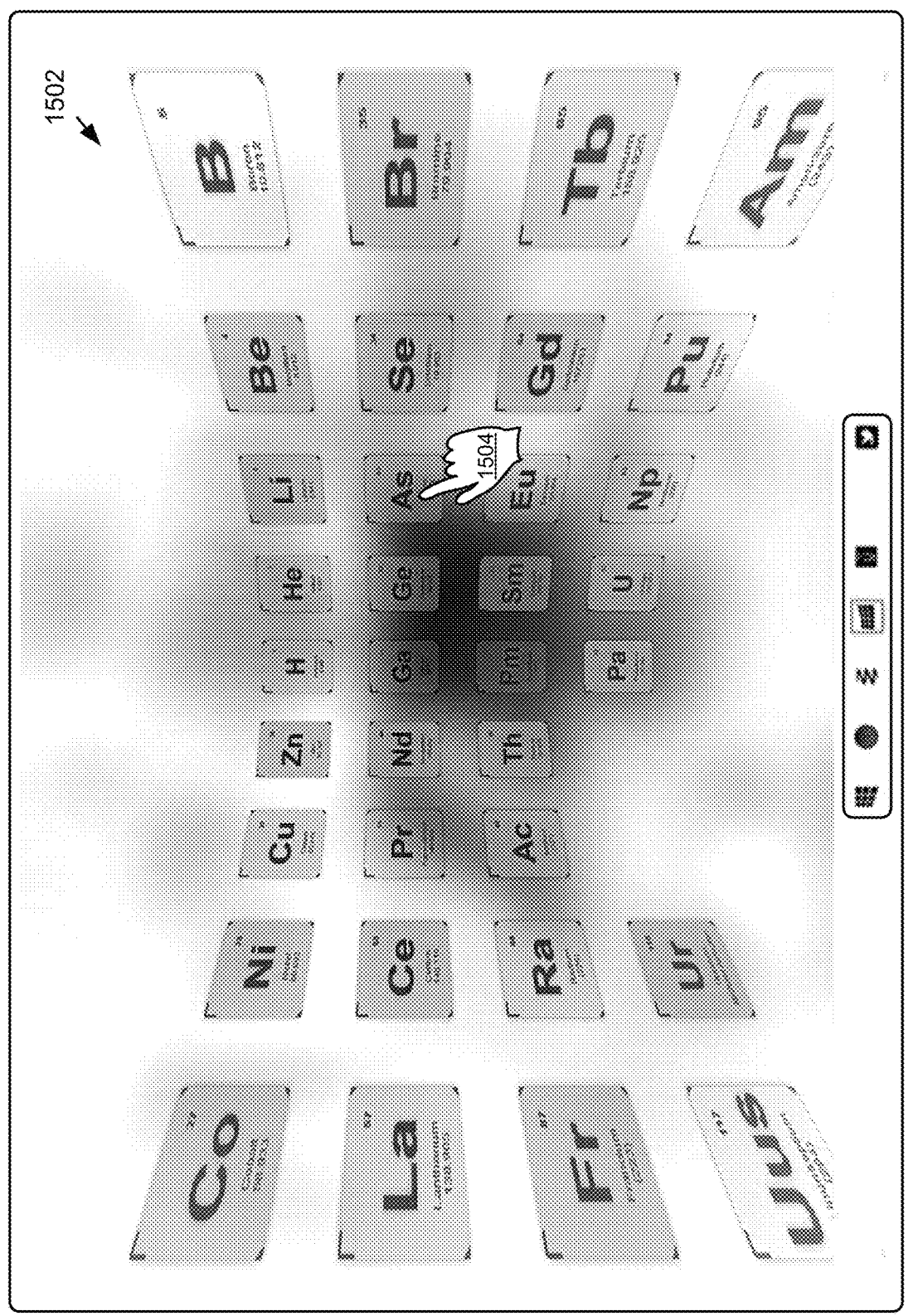
Figure 15B:
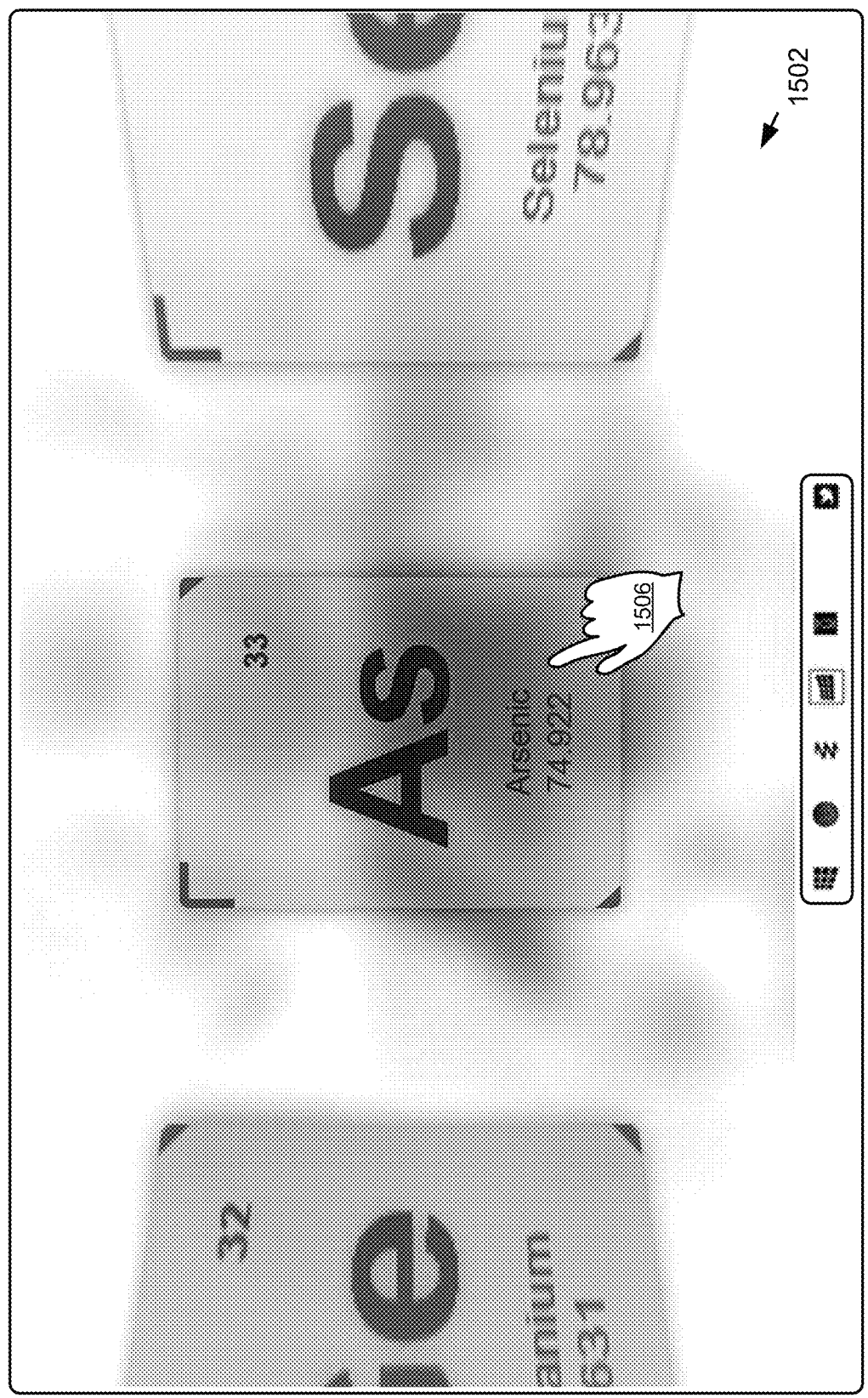
Figure 15C:
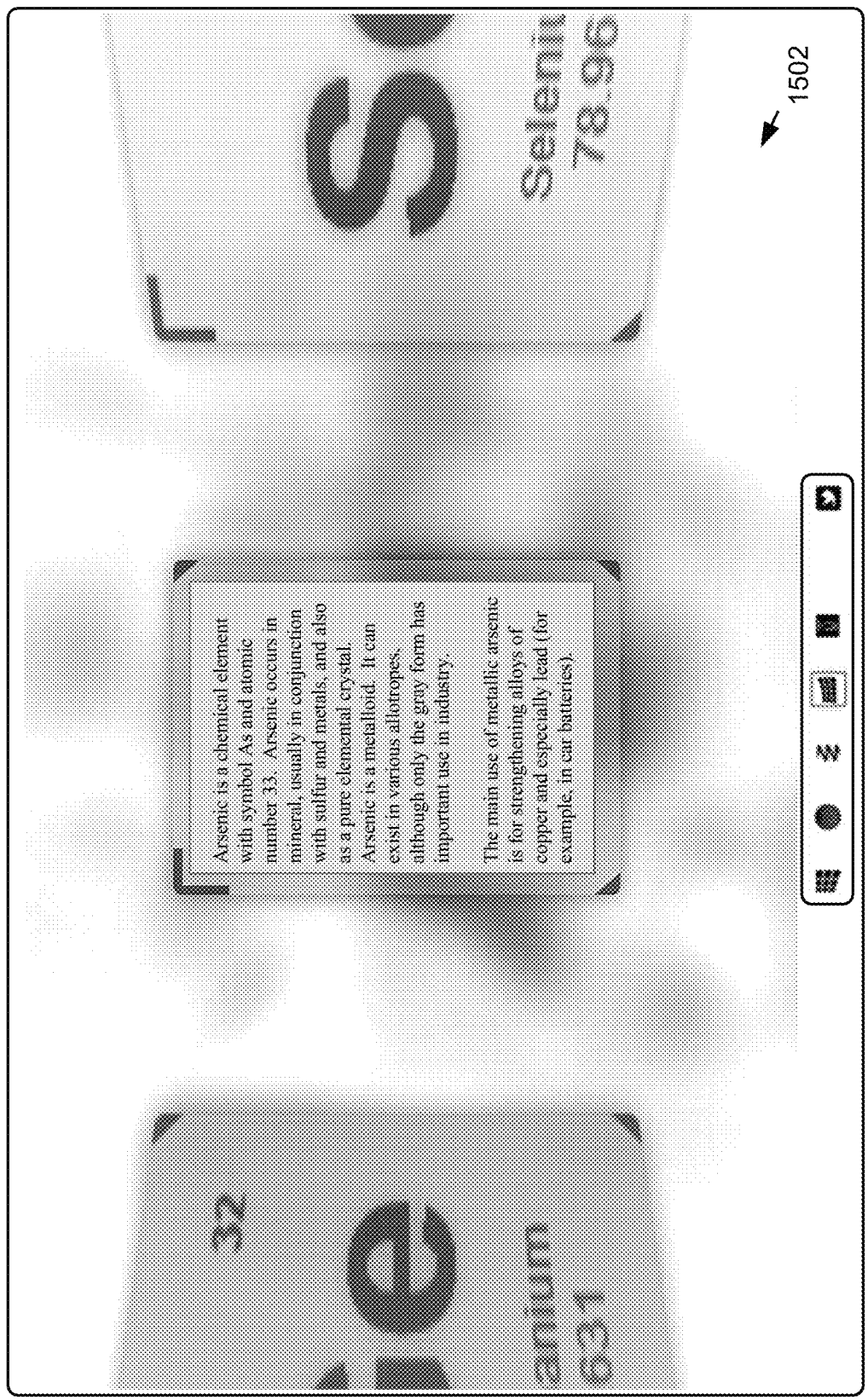

FIG. 15A shows a set of surfaces 1502 arranged in a "wall of frame" like pattern. The set of surfaces 1502 can be zoomed using a zoom gesture 1504 to a narrower set of surfaces as shown in FIG. 15B. Resulting surfaces as displayed in the narrower set can be can be moved and/or rotated using at least a velocity and/or a rotational energy agent into a desired orientation. An arbitrary surface (e.g., the Arsenic tile) can be selected using a tap gesture 1506, and in response a rotational energy agent can be applied to the surface to flip it over as shown in FIG. 15C. In this example, flipping over the surface allows the user to read about Arsenic element.

Figure 16A:
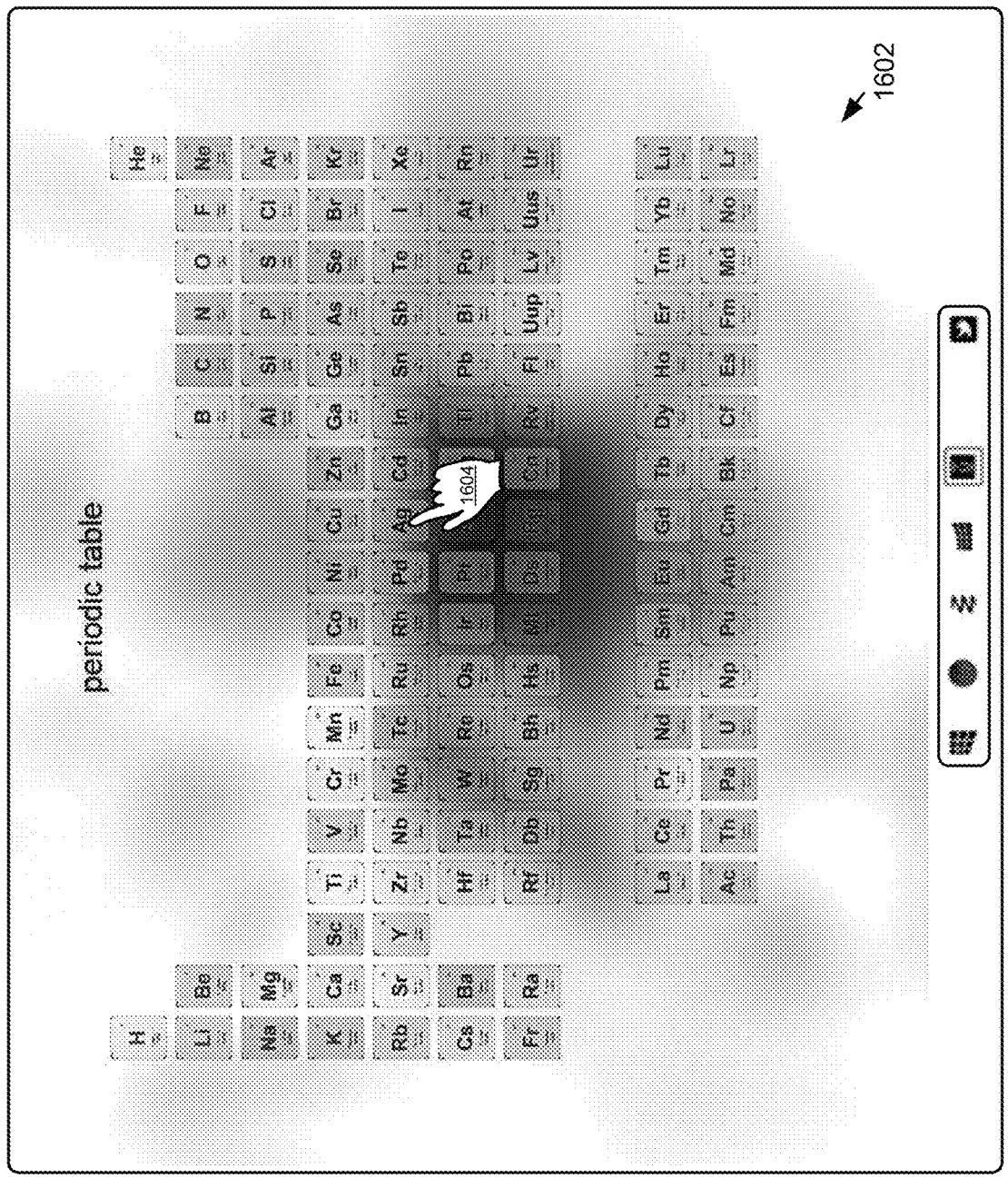
Figure 16B:
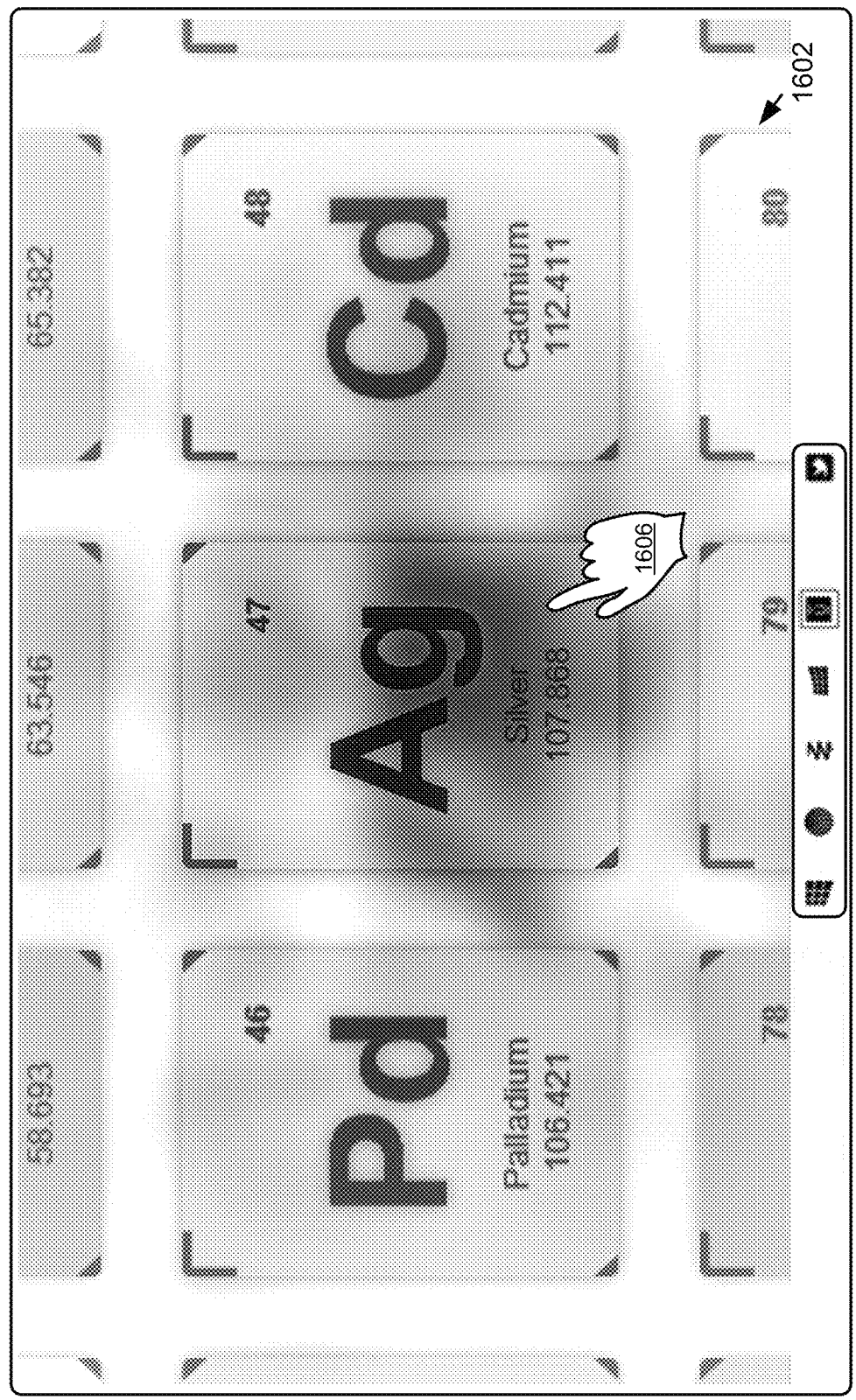
Figure 16C:
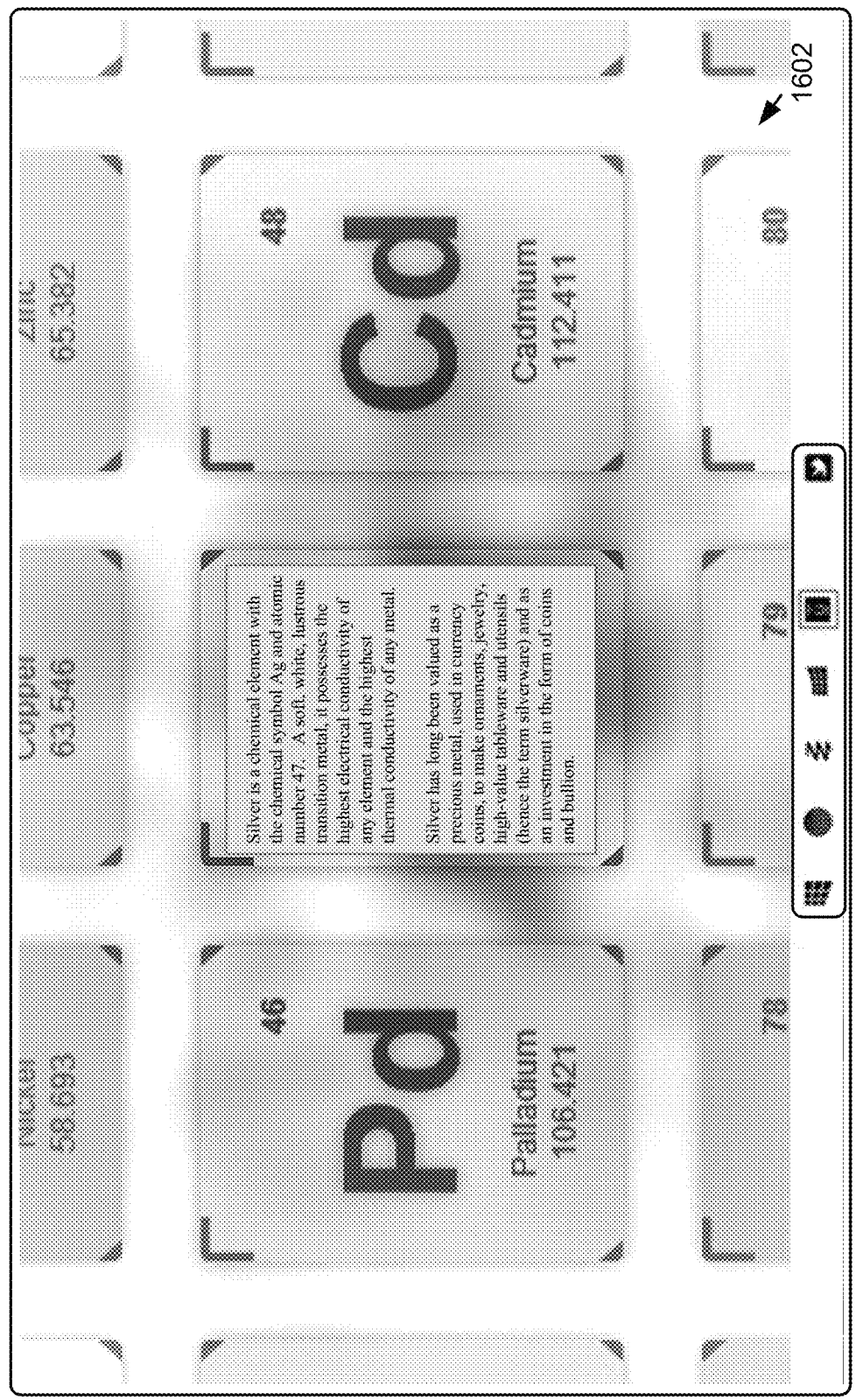

FIG. 16A shows a set of surfaces 1602 arranged in a two dimensional pattern. The set of surfaces 1602 can be zoomed using a zoom gesture 1604 to a narrower set of surfaces as shown in FIG. 16B. Resulting surfaces as displayed in the narrower set can be can be moved and/or rotated using at least a velocity and/or a rotational energy agent into a desired orientation. An arbitrary surface (e.g., the Silver tile) can be selected using a tap gesture 1606, and in response a rotational energy agent can be applied to the surface to flip it over as shown in FIG. 16C. In this example, flipping over the surface allows the user to read about Silver element.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., WiFi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   rendering via a web browser a viewport including a first context including one or more first DOM elements for display in a multi-dimensional space, and a second context including one or more second DOM elements for display in the multi-dimensional space;
   associating a first instance of a physics engine with the first context;
   associating a second instance of a physics engine with the second context;
   attaching one or more first energy agents to the one or more first DOM elements, the one or more first energy agents providing the one or more first DOM elements with one or more first attributes;
   attaching one or more second energy agents to the one or more second DOM elements, the one or more second energy agents providing the one or more second DOM elements with one or more second attributes;
   detecting one or more events manipulating the one or more first DOM elements of the first context;
   piping the one or more first energy agents attached to the one or more first DOM elements to the first instance of the physics engine associated with the first context that includes the one or more first DOM elements;
   computing, independent of the second context using the first instance of the physics engine, a transformation of the one or more first DOM elements of the first context in the multi-dimensional space based on one or more attributes of the one or more events and the one or more first attributes provided to the one or more first DOM elements by the one or more first energy agents; and
   applying a visual effect manipulating the one or more first DOM elements of the first context based on the transformation of the one or more first DOM elements computed based on the one or more attributes of the one or more events and the one or more first attributes provided to the one or more first DOM elements by the one or more first energy agents attached to the one or more first DOM elements of the first context of the viewport.

2. The computer-implemented method of claim 1, wherein applying the visual effect manipulating the one or more first DOM elements of the first context further comprises
   generating a scene graph reflecting the transformation of the one or more first DOM elements, and
   rendering the visual effect manipulating the one or more first DOM elements based on the scene graph using graphics hardware acceleration.

3. The computer-implemented method of claim 1, further comprising:
   interpreting one or more objectives for the one or more events, wherein the one or more first energy agents are computed based at least on the one or more objectives.

4. The computer-implemented method of claim 1, wherein
   detecting the one or more events includes receiving a user input and determining one or more of a directionality and speed of the user input; and
   computing the transformation includes computing a movement vector for the one or more first DOM elements based further on one or more of the directionality and the speed of the user input.

5. The computer-implemented method of claim 4, further comprising:
   placing the one or more first DOM elements in movement in the multi-dimensional space by applying the movement vector;
   determining a boundary threshold of the first context;
   determining that one or more edges of the one or more first DOM elements has moved beyond the boundary threshold;
   computing a counter force vector for the one or more first DOM elements based on a contextual attribute; and
   applying the counter force vector to oppose the movement of the one or more first DOM elements.

6. The computer-implemented method of claim 1, wherein the one or more events includes one or more of a touch event, a mouse pointer event, a keyboard event, and a motion gesture event.

7. A computer program product comprising a non-transitory computer usable medium including a computer readable program, wherein the computer readable program when executed on a computer causes the computer to:
   render via a web browser a viewport including a first context including one or more first DOM elements for display in a multi-dimensional space, and a second context including one or more second DOM elements for display in the multi-dimensional space;
   associate a first instance of a physics engine with the first context;
   associate a second instance of a physics engine with the second context;
   attach one or more first energy agents to the one or more first DOM elements, the one or more first energy agents providing the one or more first DOM elements with one or more first attributes;
   attach one or more second energy agents to the one or more second DOM elements, the one or more second energy agents providing the one or more second DOM elements with one or more second attributes;
   detect one or more events manipulating the one or more first DOM elements of the first context;
   pipe the one or more first energy agents attached to the one or more first DOM elements to the first instance of the physics engine associated with the first context that includes the one or more first DOM elements;
   compute, independent of the second context using the first instance of the physics engine, a transformation of the one or more first DOM elements of the first context in the multi-dimensional space based on one or more attributes of the one or more events and the one or more first attributes provided to the one or more first DOM elements by the one or more first energy agents; and apply a visual effect manipulating the one or more first DOM elements of the first context based on the transformation of the one or more first DOM elements computed based on the one or more attributes of the one or more events and the one or more first attributes provided to the one or more first DOM elements by the one or more first energy agents attached to the one or more first DOM elements of the first context of the viewport.

8. The computer program product of claim 7, wherein to apply the visual effect manipulating the one or more first DOM elements of the first context further comprises
generating a scene graph reflecting the transformation of the one or more first DOM elements, and
rendering the visual effect manipulating the one or more first DOM elements based on the scene graph using graphics hardware acceleration.

9. The computer program product of claim 7, wherein the computer readable program, when executed on the computer, further causes the computer to:
interpret one or more objectives for the one or more events, wherein the one or more first energy agents are computed based at least on the one or more objectives.

10. The computer program product of claim 7, wherein to detect the one or more events includes receiving a user input and determining one or more of a directionality and speed of the user input, and to compute the transformation includes computing a movement vector for the one or more first DOM elements based further on one or more of the directionality and the speed of the user input.

11. The computer program product of claim 10, wherein the computer readable program, when executed on the computer, further causes the computer to:
place the one or more first DOM elements in movement in the multi-dimensional space by applying the movement vector;
determine a boundary threshold of the first context;
determine that one or more edges of the one or more first DOM elements has moved beyond the boundary threshold;
compute a counter force vector for the one or more first DOM elements based on a contextual attribute; and
apply the counter force vector to oppose the movement of the one or more first DOM elements.

12. The computer program product of claim 7, wherein the one or more events includes one or more of a touch event, a mouse pointer event, a keyboard event, and a motion gesture event.

13. A system comprising:
one or more processors;
a rendering engine, executable by the one or more processors, to render via a web browser a viewport including a first context including one or more first DOM elements for display in a multi-dimensional space, and a second context including one or more second DOM elements for display in the multi-dimensional space;
an interaction engine, executable by the one or more processors, to detect one or more events that manipulate the one or more first DOM elements of the first context;
a first instance of a physics engine, executable by the one or more processors, to attach one or more first energy agents to the one or more first DOM elements, the one or more first energy agents providing the one or more first DOM elements with one or more first attributes, to pipe the one or more first energy agents attached to the one or more first DOM elements to the first instance of the physics engine associated with the first context that includes the one or more first DOM elements, and to compute, independent of the second context, a transformation of the one or more first DOM elements of the first context in the multi-dimensional space based on one or more attributes of the one or more events and the one or more first attributes provided to the one or more first DOM elements by the one or more first energy agents, and the rendering engine being further executable to apply a visual effect manipulating the one or more first DOM elements of the first context based on the transformation of the one or more first DOM elements computed based on the one or more attributes of the one or more events and the one or more first attributes provided to the one or more first DOM elements by the one or more first energy agents attached to the one or more first DOM elements of the first context of the viewport; and
a second instance of a physics engine, executable by the one or more processors, to attach one or more second energy agents to the one or more second DOM elements, the one or more second energy agents providing the one or more second DOM elements with one or more second attributes.

14. The system of claim 13 further comprising:
a surface translation engine, executable by the one or more processors, to generate a scene graph reflecting the transformation of the one or more first DOM elements, wherein
the rendering engine is further executable to render the visual effect manipulating the one or more first DOM elements based on the scene graph using graphics hardware acceleration.

15. The system of claim 13, further comprising:
an input engine, executable by the one or more processors, to interpret one or more objectives for the one or more events, wherein the one or more first energy agents are computed based at least on the one or more objectives.

16. The system of claim 13, further comprising:
an input engine, executable by the one or more processors, to receive, via the interaction engine, a user input and to determine one or more of a directionality and speed of the user input, wherein the first instance of the physics engine is further executable to compute the transformation by computing a movement vector for the one or more first DOM elements based further on one or more of the directionality and the speed of the user input.

17. The system of claim 16, wherein the rendering engine is further executable to:
place the one or more first DOM elements in movement in the multi-dimensional space by applying the movement vector,
determine a boundary threshold of the first context,
determine that one or more edges of the one or more first DOM elements has moved beyond the boundary threshold,
compute a counter force vector for the one or more first DOM elements based on a contextual attribute, and
apply the counter force vector to oppose the movement of the one or more first DOM elements.

18. The system of claim 13, wherein the one or more events includes one or more of a touch event, a mouse pointer event, a keyboard event, and a motion gesture event.

19. A system comprising:
- means for rendering via a web browser a viewport including a first context including one or more first DOM elements for display in a multi-dimensional space, and a second context including one or more second DOM elements for display in the multi-dimensional space;
- means for associating a first instance of a physics engine with the first context;
- means for associating a second instance of a physics engine with the second context;
- means for attaching one or more first energy agents to the one or more first DOM elements, the one or more first energy agents providing the one or more first DOM elements with one or more first attributes;
- means for attaching one or more second energy agents to the one or more second DOM elements, the one or more second energy agents providing the one or more second DOM elements with one or more second attributes;
- means for detecting one or more events manipulating the one or more first DOM elements of the first context;
- means for piping the one or more first energy agents attached to the one or more first DOM elements to the first instance of the physics engine associated with the first context that includes the one or more first DOM elements;
- means for computing, independent of the second context using the first instance of the physics engine, a transformation of the one or more first DOM elements of the first context in the multi-dimensional space based on one or more attributes of the one or more events and the one or more first attributes provided to the one or more first DOM elements by the one or more first energy agents; and
- means for applying a visual effect manipulating the one or more first DOM elements of the first context based on the transformation of the one or more first DOM elements computed based on the one or more attributes of the one or more events and the one or more first attributes provided to the one or more first DOM elements by the one or more first energy agents attached to the one or more first DOM elements of the first context of the viewport.

* * * * *